US010755205B2

(12) United States Patent
Fox et al.

(10) Patent No.: US 10,755,205 B2
(45) Date of Patent: *Aug. 25, 2020

(54) DETERMINING EVEN-SPACED QUANTILES

(71) Applicant: American Airlines, Inc., Fort Worth, TX (US)

(72) Inventors: James Fox, Phoenix, AZ (US); Marcial Lapp, Tempe, AZ (US); Julianne Bowles, Tempe, AZ (US); Randeep Ramamurthy, Phoenix, AZ (US); Yuxi Xiao, Tempe, AZ (US); Daniel Muzich, Phoeniz, AZ (US); Thomas Trenga, Mesa, AZ (US)

(73) Assignee: AMERICAN AIRLINES, INC., Fort Worth, TX (US)

(*) Notice: Subject to any disclaimer, the term of this patent is extended or adjusted under 35 U.S.C. 154(b) by 22 days.

This patent is subject to a terminal disclaimer.

(21) Appl. No.: 15/884,094

(22) Filed: Jan. 30, 2018

(65) Prior Publication Data
US 2018/0174080 A1 Jun. 21, 2018

Related U.S. Application Data

(63) Continuation of application No. 14/157,960, filed on Jan. 17, 2014, now abandoned, which is a continuation of application No. 14/157,869, filed on Jan. 17, 2014, now abandoned.

(51) Int. Cl.
G06Q 10/02 (2012.01)
G06Q 10/06 (2012.01)
G06Q 30/02 (2012.01)
G06Q 50/14 (2012.01)

(52) U.S. Cl.
CPC ......... *G06Q 10/02* (2013.01); *G06Q 10/0631* (2013.01); *G06Q 30/0206* (2013.01); *G06Q 50/14* (2013.01)

(58) Field of Classification Search
CPC . G06Q 10/02; G06Q 10/0631; G06Q 30/0206
USPC .............................................. 705/7.11, 7.12
See application file for complete search history.

(56) References Cited

U.S. PATENT DOCUMENTS

| 5,255,184 | A | 10/1993 | Hornick et al. | |
| 5,270,921 | A * | 12/1993 | Hornick | G06Q 10/02 705/28 |
| 5,918,209 | A | 6/1999 | Campbell et al. | |
| 5,929,842 | A * | 7/1999 | Vertregt | G01R 13/02 345/690 |
| 6,085,169 | A | 7/2000 | Walker et al. | |
| 6,112,185 | A | 8/2000 | Walker et al. | |
| 6,263,315 | B1 | 7/2001 | Talluri | |
| 6,974,079 | B1 | 12/2005 | Strothmann | |

(Continued)

OTHER PUBLICATIONS

Williamson, Elizabeth, L., "Comparison of Optimization Techniques for Origin-Destination Seat Inventory Control", Flight Transportation Laboratory Report R 88-2, May 1988.*

(Continued)

*Primary Examiner* — Renae Feacher
(74) *Attorney, Agent, or Firm* — Snell & Wilmer L.L.P.

(57) ABSTRACT

A computer based system for determining even-spaced quantiles using class authorization level values and network values. Determining a curve and a set of revised values, and remapping based on the revised values.

20 Claims, 16 Drawing Sheets

(56) References Cited

U.S. PATENT DOCUMENTS

| | | | |
|---|---|---|---|
| 7,085,726 | B1 | 8/2006 | Galperin et al. |
| 7,212,978 | B2 | 5/2007 | Kowal et al. |
| 7,899,691 | B1 | 3/2011 | Lee |
| 8,190,457 | B1* | 5/2012 | Chandler ............... G06Q 10/02 705/5 |
| 8,452,625 | B2 | 5/2013 | Maguire |
| 2002/0059101 | A1 | 5/2002 | Ratliff |
| 2002/0111935 | A1 | 8/2002 | Jones |
| 2002/0120492 | A1* | 8/2002 | Phillips ................. G06Q 10/06 705/7.35 |
| 2002/0156659 | A1* | 10/2002 | Walker .................. G06Q 20/00 705/5 |
| 2002/0161610 | A1* | 10/2002 | Walker ................ G06Q 20/403 705/5 |
| 2002/0161689 | A1 | 10/2002 | Segal |
| 2003/0036928 | A1 | 2/2003 | Kaenigsberg |
| 2003/0065542 | A1* | 4/2003 | Gliozzi ............ G06Q 10/06315 705/5 |
| 2003/0115093 | A1* | 6/2003 | Lim ..................... G06Q 10/025 705/7.31 |
| 2004/0249685 | A1 | 12/2004 | Douglas |
| 2005/0065838 | A1 | 3/2005 | Kalagnanm |
| 2006/0195356 | A1 | 8/2006 | Nerenhausen et al. |
| 2007/0143153 | A1 | 6/2007 | Ashby |
| 2007/0294117 | A1 | 12/2007 | Lopp |
| 2008/0027768 | A1 | 1/2008 | Thurlow |
| 2008/0052185 | A1 | 2/2008 | Goel |
| 2008/0071939 | A1 | 3/2008 | Tanaka |
| 2008/0183512 | A1 | 7/2008 | Benzinger |
| 2009/0024423 | A1 | 1/2009 | Hay |
| 2009/0088814 | A1* | 4/2009 | Good .................... A61B 5/0452 607/25 |
| 2009/0216568 | A1 | 8/2009 | Raufaste |
| 2009/0234710 | A1* | 9/2009 | Belgaied Hassine .. G06Q 30/02 705/7.29 |
| 2009/0287518 | A1 | 11/2009 | Marode et al. |
| 2010/0153143 | A1 | 6/2010 | Baggett |
| 2010/0250291 | A1 | 9/2010 | Walker et al. |
| 2011/0010205 | A1 | 1/2011 | Richards |
| 2011/0071886 | A1 | 3/2011 | Schnur |
| 2011/0145087 | A1* | 6/2011 | Daman ................... H04L 67/12 705/26.3 |
| 2011/0153373 | A1 | 6/2011 | Dantzig |
| 2012/0035965 | A1 | 2/2012 | Maguire et al. |
| 2012/0078667 | A1 | 3/2012 | Denker |
| 2012/0271679 | A1 | 10/2012 | Schroder |
| 2012/0284064 | A1 | 11/2012 | Sussman et al. |
| 2012/0310706 | A1 | 12/2012 | Nguyen |
| 2013/0024217 | A1 | 1/2013 | Pradignac |
| 2013/0103434 | A1 | 4/2013 | Cazeaux |
| 2013/0103439 | A1 | 4/2013 | Vernitsky |
| 2013/0339070 | A1 | 12/2013 | Meghji |
| 2014/0108067 | A1 | 4/2014 | Gluhovsky |
| 2014/0257881 | A1* | 9/2014 | Tracy ..................... G06Q 10/02 705/5 |
| 2014/0344023 | A1* | 11/2014 | Chiu .................. G06Q 30/0206 705/7.35 |
| 2015/0154511 | A1 | 6/2015 | Magnat |
| 2015/0324326 | A1* | 11/2015 | Chen ....................... H04L 67/10 702/179 |
| 2016/0350396 | A1* | 12/2016 | Blanc ...................... G06F 16/27 |
| 2017/0061333 | A1* | 3/2017 | Endres ................. G06Q 10/109 |

OTHER PUBLICATIONS

Fiig et al., (Optimization of mixed fare structures: Theory and applications, Journal of Revenue and Pricing Management, vol. 9, 1/2, 152-170, 2010.*

Chatwin, Richard, "Multiperiod Airline Overbooking with a Single Fare Class," Operations Research, vol. 46, No. 6, Nov.-Dec. 1998.*

Pak, Kevin and Piersma, Nanda, "Overview of OR Techniques for Airline Revenue Management," Statistica Neerlandica (2002) bol. 56, nr. 4, pp. 479-495.*

USPTO, Advisory Action dated Mar. 30, 2018 in U.S. Appl. No. 13/791,711.
Advisory Action dated Jan. 26, 2018 in U.S. Appl. No. 14/157,960.
Final Office Action dated Feb. 7, 2018 in U.S. Appl. No. 13/791,711.
Office Action dated Sep. 26, 2012 in U.S. Appl. No. 13/352,757.
Office Action dated Oct. 9, 2012 in U.S. Appl. No. 13/352,667.
Office Action dated Mar. 27, 2013, 2013 in U.S. Appl. No. 13/352,628.
Office Action dated Apr. 8, 2013, 2013 in U.S. Appl. No. 13/348,417.
Requirement for Information dated Apr. 11, 2013 in U.S. Appl. No. 13/352,719.
Office Action dated Sep. 12, 2013 in U.S. Appl. No. 13/352,667.
Final Office Action dated Oct. 16, 2013 in U.S. Appl. No. 13/352,628.
Notice of Allowance dated Oct. 25, 2013 in U.S. Appl. No. 13/352,667.
Office Action dated Oct. 31, 2013 in U.S. Appl. No. 13/348,417.
Notice of Allowance dated Oct. 31, 2013 in U.S. Appl. No. 13/352,667.
Advisory Action dated Jan. 16, 2014 in U.S. Appl. No. 13/352,628.
Office Action dated May 9, 2014 in U.S. Appl. No. 13/352,719.
Office Action dated Jun. 9, 2014 in U.S. Appl. No. 13/348,417.
Final Office Action dated Jun. 18, 2014 in U.S. Appl. No. 13/352,719.
Office Action dated Aug. 5, 2014 in U.S. Appl. No. 13/352,719.
Final Office Action dated Sep. 8, 2014 in U.S. Appl. No. 13/352,719.
Office Action dated Oct. 9, 2014 in U.S. Appl. No. 13/348,417.
Final Office Action dated Oct. 22, 2014 in U.S. Appl. No. 13/348,417.
Advisory Action dated Jan. 2, 2015 in U.S. Appl. No. 13/348,417.
Office Action dated Feb. 13, 2015 in U.S. Appl. No. 13/352,628.
Final Office Action dated Mar. 12, 2015 in U.S. Appl. No. 13/352,628.
Advisory Action dated Apr. 3, 2015 in U.S. Appl. No. 13/352,628.
Office Action dated Mar. 23, 2015 in U.S. Appl. No. 14/038,278.
Office Action dated May 11, 2015 in U.S. Appl. No. 13/791,711.
Office Action dated Jun. 5, 2015 in U.S. Appl. No. 13/791,672.
Office Action dated Jun. 18, 2015 in U.S. Appl. No. 13/348,417.
Office Action dated Jun. 25, 2015 in U.S. Appl. No. 13/352,719.
Office Action dated Jul. 10, 2015 in U.S. Appl. No. 13/352,628.
Final Office Action dated Sep. 8, 2015 in U.S. Appl. No. 14/038,278.
Office Action dated Sep. 9, 2015 in U.S. Appl. No. 13/791,691.
Final Office Action dated Sep. 10, 2015 in U.S. Appl. No. 13/352,719.
Final Office Action dated Sep. 11, 2015 in U.S. Appl. No. 13/348,417.
Advisory Action dated Sep. 18, 2015 in U.S. Appl. No. 14/038,278.
Advisory Action dated Sep. 24, 2015 in U.S. Appl. No. 13/348,417.
Advisory Action dated Sep. 25, 2015 in U.S. Appl. No. 13/352,719.
Final Office Action dated Sep. 25, 2015 in U.S. Appl. No. 13/791,711.
Final Office Action dated Sep. 29, 2015 in U.S. Appl. No. 13/352,628.
Advisory Action dated Oct. 16, 2015 in U.S. Appl. No. 13/352,628.
Office Action dated Nov. 6, 2015 in U.S. Appl. No. 13/352,719.
Advisory Action dated Nov. 6, 2015 in U.S. Appl. No. 13/791,711.
Final Office Action dated Nov. 6, 2015 in U.S. Appl. No. 14/038,278.
Office Action dated Nov. 25, 2015 in U.S. Appl. No. 13/348,417.
Office Action dated Dec. 3, 2015 in U.S. Appl. No. 13/352,628.
Restriction Requirement dated Dec. 10, 2015 in U.S. Appl. No. 14/157,960.
Final Office Action dated Dec. 24, 2015 in U.S. Appl. No. 13/791,672.
Advisory Action dated Dec. 30, 2015 in U.S. Appl. No. 14/038,278.
Office Action dated Feb. 1, 2016 in U.S. Appl. No. 14/157,869.
Office Action dated Feb. 11, 2016 in U.S. Appl. No. 14/038,278.
Final Office Action dated Feb. 25, 2016 in U.S. Appl. No. 13/791,691.
Final Office Action dated Mar. 18, 2016 in U.S. Appl. No. 13/352,719.
Final Office Action dated Mar. 23, 2016 in U.S. Appl. No. 13/348,417.
Final Office Action dated Mar. 23, 2016 in U.S. Appl. No. 13/352,628.
Advisory Action dated Apr. 18, 2016 in U.S. Appl. No. 13/791,672.
Office Action dated May 5, 2016 in U.S. Appl. No. 14/157,960.
Advisory Action dated May 12, 2016 in U.S. Appl. No. 13/348,417.
Advisory Action dated May 12, 2016 in U.S. Appl. No. 13/352,719.
Advisory Action dated May 20, 2016 in U.S. Appl. No. 13/791,691.
Office Action dated May 20, 2016 in U.S. Appl. No. 13/791,711.
Advisory Action dated May 27, 2016 in U.S. Appl. No. 13/352,628.
Final Office Action dated Jun. 14, 2016 in U.S. Appl. No. 14/038,278.
Office Action dated Jun. 30, 2016 in U.S. Appl. No. 13/352,719.
Office Action dated Jul. 1, 2016 in U.S. Appl. No. 13/348,417.
Office Action dated Jul. 1, 2016 in U.S. Appl. No. 13/352,628.
Office Action dated Jul. 5, 2016 in U.S. Appl. No. 13/791,691.
Advisory Action dated Jul. 11, 2016 in U.S. Appl. No. 14/038,278.

(56) References Cited

OTHER PUBLICATIONS

Final Office Action dated Aug. 11, 2016 in U.S. Appl. No. 14/157,869.
Office Action dated Sep. 13, 2016 in U.S. Appl. No. 13/791,672.
Office Action dated Sep. 28, 2016 in U.S. Appl. No. 14/038,278.
Advisory Action dated Nov. 2, 2016 in U.S. Appl. No. 14/157,869.
Final Office Action dated Nov. 10, 2016 in U.S. Appl. No. 13/348,417.
Final Office Action dated Nov. 10, 2016 in U.S. Appl. No. 13/791,711.
Final Office Action dated Nov. 14, 2016 in U.S. Appl. No. 13/352,628.
Final Office Action dated Nov. 15, 2016 in U.S. Appl. No. 13/352,719.
Final Office Action dated Nov. 30, 2016 in U.S. Appl. No. 14/157,960.
Final Office Action dated Dec. 15, 2016 in U.S. Appl. No. 13/791,691.
Office Action dated Dec. 21, 2016 in U.S. Appl. No. 14/157,869.
Advisory Action dated Feb. 2, 2017 in U.S. Appl. No. 13/791,711.
Advisory Action dated Feb. 6, 2017 in U.S. Appl. No. 13/352,628.
Advisory Action dated Feb. 7, 2017 in U.S. Appl. No. 13/352,719.
Advisory Action dated Feb. 7, 2017 in U.S. Appl. No. 14/157,960.
Advisory Action dated Feb. 13, 2017 in U.S. Appl. No. 13/348,417.
Final Office Action dated Feb. 24, 2017 in U.S. Appl. No. 13/352,719.
Final Office Action dated Feb. 27, 2017 in U.S. Appl. No. 13/352,628.
Advisory Action dated Feb. 28, 2017 in U.S. Appl. No. 13/791,691.
Final Office Action dated Mar. 22, 2017 in U.S. Appl. No. 14/038,278.
Office Action dated Mar. 23, 2017 in U.S. Appl. No. 15/041,669.
Office Action dated Mar. 27, 2017 in U.S. Appl. No. 13/348,417.
Final Office Action dated Mar. 31, 2017 in U.S. Appl. No. 13/791,672.
Office Action dated Apr. 12, 2017 in U.S. Appl. No. 13/791,691.
Advisory Action dated Apr. 25, 2017 in U.S. Appl. No. 13/352,719.
Office Action dated May 4, 2017 in U.S. Appl. No. 13/352,719.
Advisory Action dated May 15, 2017 in U.S. Appl. No. 14/038,278.
Advisory Action dated May 22, 2017 in U.S. Appl. No. 13/352,628.
Office Action dated Jun. 6, 2017 in U.S. Appl. No. 13/352,628.
Final Office Action dated Jun. 7, 2017 in U.S. Appl. No. 14/157,869.
Final Office Action dated Jun. 16, 2017 in U.S. Appl. No. 14/038,278.
Notice of Allowance dated Jun. 27, 2017 in U.S. Appl. No. 13/791,672.
Office Action dated Jun. 27, 2017 in U.S. Appl. No. 14/157,960.
Final Office Action dated Jul. 27, 2017 in U.S. Appl. No. 13/791,691.
Final Office Action dated Aug. 11, 2017 in U.S. Appl. No. 13/352,719.
Advisory Action dated Aug. 16, 2017 in U.S. Appl. No. 14/157,869.
Final Office Action dated Aug. 17, 2017 in U.S. Appl. No. 13/348,417.
Advisory Action dated Aug. 23, 2017 in U.S. Appl. No. 14/038,278.
Office Action dated Sep. 8, 2017 in U.S. Appl. No. 13/791,711.
Advisory Action dated Sep. 28, 2017 in U.S. Appl. No. 13/791,691.
Final Office Action dated Oct. 4, 2017 in U.S. Appl. No. 15/041,669.
Final Office Action dated Oct. 5, 2017 in U.S. Appl. No. 13/352,628.
Advisory Action dated Oct. 17, 2017 in U.S. Appl. No. 13/348,417.
Advisory Action dated Oct. 12, 2017 in U.S. Appl. No. 13/352,719.
Advisory Action dated Nov. 15, 2017 in U.S. Appl. No. 15/041,669.
Final Office Action dated Dec. 21, 2017 in U.S. Appl. No. 14/157,960.
Boyd, "Revenue Management and Dynamic Pricing: Part 1," PROS Revenue Management, Sep. 2002, 77 pages, https://www.ima.umn.edu/talks/workshops/9-9-13.2002/boyd/boyd.ppt.
Williamson, "Comparison of Optimization Techniques for Origin-Destination Seat Inventory Control," Flight Transportation Laboratory Report R 88-2, pp. 1-169, May 1988.
"Fundamentals of Pricing and Revenue Management Chapter 4," George Mason University, Feb. 2010, 70 pages, retrieved from: http://catsr.ite.gmu.edu/SYST660/Chap4_Fundamentals_of_Pricing_and_Revenue_Management.pdf.
Kayser, "RM Methods for Multiple Fare Structure Environments," published by Massachusetts Institute of Technology on Jun. 2008, pp. 1-115.
Gorin, "Incorporating cancel and rebook behavior in revenue management optimization," published by Journal of Revenue and Pricing Management, vol. 11, No. 6, Jan. 24, 2012, pp. 645-660.
Fiig, "Optimization of mixed far structures: Theory and applications," published by Journal of Revenue and Pricing Management, vol. 9, No. 1/2, Apr. 7, 2009, pp. 152-170.
Belobaba, "Airline Revenue Management: Flight Leg and Network Optimization—1.201 Transportation Systems Analysis: Demand & Economics," Fall 2008, http://ocw.mit.edu/courses/civil-and-environmental-engineering/1-201j-transportation-systems-analysis-demand-and-econimics-fall-2008/lecture-notes/MIT1_201JF08_lec17.pdf retrieved Apr. 20, 2015, 40 pages.
Department of Transportation, "Enhancing Airline Passenger Protections," http://web.archive.org/web/20121031135020/http://usatoday30.usatoday.com/travel/pdf/dot_enhancing_airline_passenger_protections.pdf, Oct. 31, 2012, retrieved Apr. 20, 2015, 84 pages.
Joseph Coughlan, "Airline Overbooking in the Multi-Class Case" dated Jan. 1, 1999, Dublin Institute of Technology, Journal of the Operational Research Society, vol. 50, 1999, pp. 1098-1103.
"Optimal Overbooking" dated Feb. 11, 2002 by Duke Mathematics Department, Team 180, 42 Pages.
Luke Ouko, Arnan Sipitakiat and Carla Gomez-Monroy, "Should Airlines Overbook?" dated May 12, 2003, Systems Dynamics for Engineers, 28 Pages.
Alexander Erdelyi and Huseyin Topaloglu, "A Dynamic Programming Decomposition Method for Making Overbooking Decisions over an Airline Network" dated Jun. 1, 2009, School of Operations Research and Information Engineering, Cornell University, Ithaca, New York, pp. 1-29.
Zhao et al. "A Dynamic Model for Airline Seat Allocation with Passenger Diversion and No-Shows"; Transportation Science, Feb. 2001, vol. 35, No. 1, pp. 80-98.
Cao et al "Data mining Techniques to improve no-show forecasting" Service Operations and Logistics and Informatics (SOLI), 2010 IEEE International Conference Jul. 2010, pp. 40-45.
Garrow et al. "Predicting Air Travelers' No-Show and Standby Behavior Using Passenger and Directional Itinerary Information" Journal of Air Transport Management Jun. 23, 2004, pp. 1-32.
Illiescu, et al., "Analysis of U.S. Airlines Passengers' Refund and Exchange Behavior Across Multiple Airlines," pp. 1-25, May 2006.
Advisory Action dated Jan. 26, 2018 inn U.S. Appl. No. 14/157,960.
Final Office Action dated Oct. 19, 2018 in U.S. Appl. No. 13/791,711.
Advisory Action dated Nov. 5, 2018 in U.S. Appl. No. 13/791,711.
Non-Final Office Action dated Dec. 31, 2018 in U.S. Appl. No. 15/693,140.
Non-Final Office Action dated Feb. 7, 2019 in U.S. Appl. No. 15/695,466.
Final Office Action dated May 20, 2019 in U.S. Appl. No. 15/695,466.
Non-Final Office Action dated Jun. 26, 2019 in U.S. Appl. No. 13/791,711.
Final Office action dated Jul. 9, 2019 in U.S. Appl. No. 15/693,140.
Non-Final Office Action dated Jul. 11, 2019 in U.S. Appl. No. 15/809,105.
Non-Final Office Action dated Jul. 25, 2019 in U.S. Appl. No. 15/823,888.
Non-Final Office Action dated Aug. 7, 2019 in U.S. Appl. No. 15/726,207.
Advisory action dated Jun. 27, 2019 in U.S. Appl. No. 15/695,446.
Non-Final Office Action dated Jul. 26, 2018 in U.S. Appl. No. 13/791,711.
Non-Final Office Action dated Nov. 18, 2019 in U.S. Appl. No. 15/693,140.
Advisory Action dated Nov. 27, 2019 in U.S. Appl. No. 13/791,711.
Advisory Action dated Nov. 29, 2019 in U.S. Appl. No. 15/809,105.
Final Office Action dated Dec. 31, 2019 in U.S. Appl. No. 15/809,105.
Final Office Action dated Jan. 14, 2020 in U.S. Appl. No. 15/823,888.
Final Office Action dated Jan. 22, 2020 in U.S. Appl. No. 15/726,207.

* cited by examiner

DETERMINING EVEN-SPACED QUANTILES

CROSS REFERENCE TO RELATED APPLICATIONS

This application is a continuation of, claims priority to and the benefit of, U.S. Ser. No. 14/157,960 filed Jan. 17, 2014, entitled "NETWORK OPTIMIZATION SYSTEMS AND METHODS FOR REVENUE MANAGEMENT UTILIZING AUTHORIZATION LEVEL TO EXPECTED NETWORK REVENUE CONVERSION." The '960 application is a continuation of U.S. Ser. No. 14/157,869 filed on Jan. 17, 2014, entitled "NETWORK OPTIMIZATION SYSTEMS AND METHODS FOR REVENUE MANAGEMENT UTILIZING DEMAND CLASS REMAPPING." The contents of both are incorporated herein by reference in their entirety.

TECHNICAL FIELD

The present disclosure generally relates to forecasting and optimization, and more particularly, to analysis methods and tools suitable for use in connection with yield management systems, inventory control systems, revenue management systems, and/or the like.

BACKGROUND

Transportation services industries, and particularly the airline industry, are often associated with high costs and varying degrees of profitability. As a result, airlines often seek new sources of income (e.g., a la carte pricing for additional services) and innovative ways to increase revenues and/or reduce costs (e.g., optimizing existing processes).

Moreover, many airlines and other transportation networks are organized around a traditional "hub and spoke" model. In such systems, multiple paths exist between a given location pair (e.g., an origin and an ultimate destination, for example, LAX airport and JFK airport connected via PHX airport). Accordingly, improved network assessment and/or optimization systems and methods remain desirable. For example, systems and methods capable of assessing the value of passengers on various network paths and segments. Stated another way, it remains desirable to be able to account for, model, and/or otherwise assess the differing value of a passenger booking, dependent at least in part on route.

SUMMARY

In an exemplary embodiment, a method for airline network optimization comprises determining, by a processor for airline network optimization and based on a set of class authorization level (AU) values, a set of expected network revenue (ENR) values. The set of class AU values were generated by a forecasting system. The method further comprises determining, by the processor and based on the set of ENR values, a set of revised class AU values, and remapping, by the processor and based on the network value of each flight leg in a set of flight leg bookings, the set of flight leg bookings to form a set of remapped flight leg bookings. The set of flight leg bookings are generated based on the set of revised class AU values.

In another exemplary embodiment, a non-transitory computer-readable storage medium has computer-executable instructions stored thereon that, in response to execution by a processor for airline network optimization, cause the processor to perform operations comprising: determining, by a processor for airline network optimization and based on a set of class authorization level (AU) values, a set of expected network revenue (ENR) values; determining, by the processor and based on the set of ENR values, a set of revised class AU values; and remapping, by the processor and based on the network value of each flight leg in a set of flight leg bookings, the set of flight leg bookings to form a set of remapped flight leg bookings. The set of class AU values were generated by a forecasting system, and the set of flight leg bookings are generated based on the set of revised class AU values.

In another exemplary embodiment, a method for authorization level (AU) to expected network revenue (ENR) conversion comprises: determining, by a processor for converting class AU values and based on a set of class AU values and for each fare class in an airline flight, the number of seat protects to fit to a bid-price curve; determining, by the processor and for each fare class, even-spaced quantiles based upon the number of seat protects to fit in that fare class; and generating, by the processor and using a distribution table, a set of ENR values based on the quantile for each seat.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

Figure 1A:
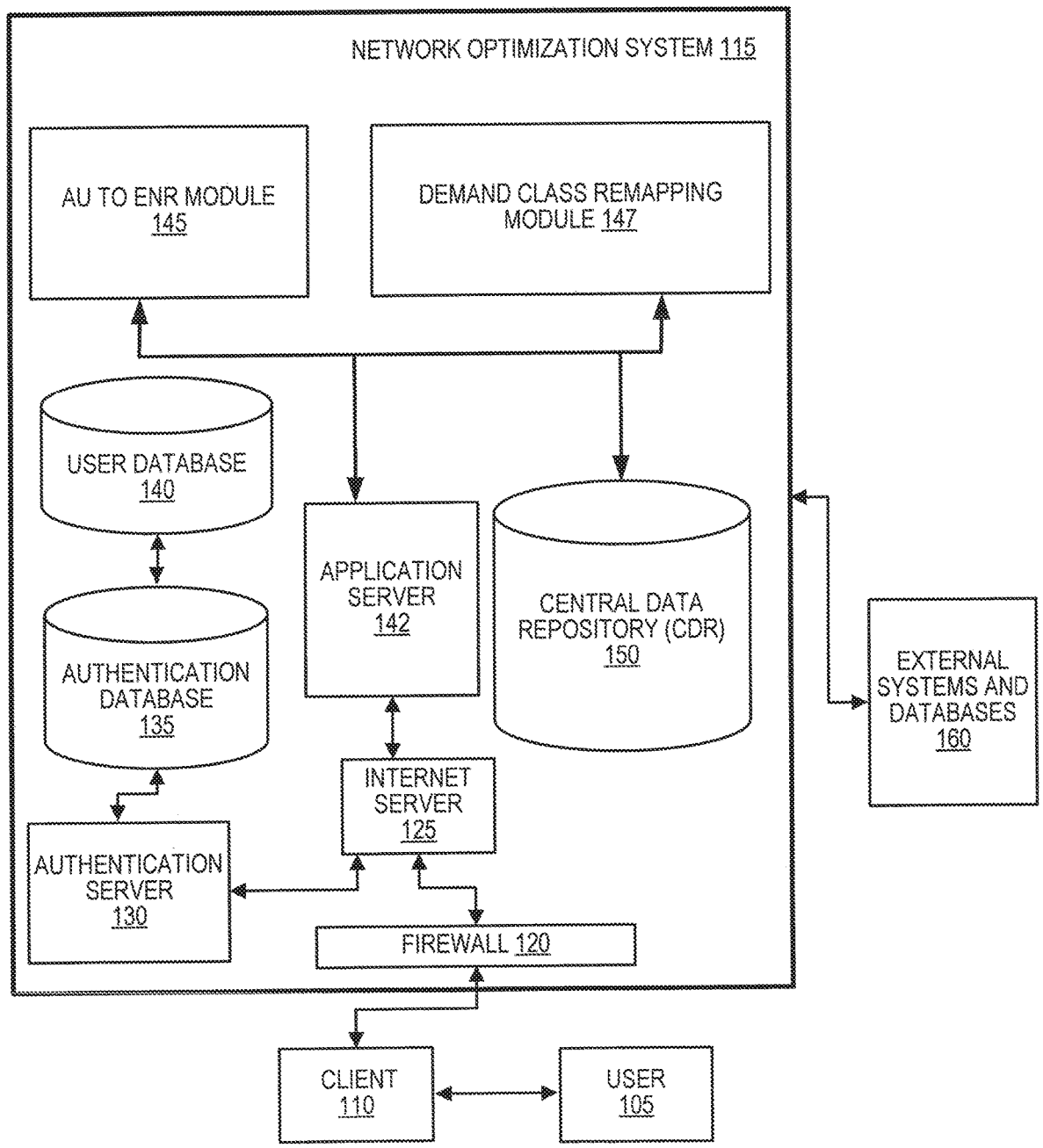
FIG. 1A is a block diagram illustrating exemplary network optimization system components in accordance with various embodiments.

Principles of the present disclosure can reshape the way organizations forecast, calculate, optimize, and/or implement decisions, such as revenue management and/or cost reduction strategies. For example, principles of the present disclosure enable airlines to assess demand from a flight leg perspective, while assessing passenger value from a network perspective. Stated another way, principles of the present disclosure recognize that flight class availability at the leg level does not necessarily correspond to overall availability at the network level. In general, principles of the present disclosure allow for increased accuracy in network optimization, forecasting, revenue management, and/or the like, at least in part by virtue of utilizing a monetary value rather than a class identifier in connection with various assessments.

While the present disclosure discusses "airlines" and "flights" for purposes of convenience and illustration, one of skill in the art will appreciate that the network optimization methods, systems, and tools disclosed herein are broadly applicable, for example to any transportation industry, such as buses, cruise ships, passenger trains, and the like.

Various embodiments of principles of the present disclosure employ forecasting, statistical analysis and/or optimization techniques. For more information regarding such techniques refer to, for example: "The Theory and Practice of Revenue Management" (International Series in Operations Research & Management Science) by Kalyan T. Talluri and Garrett J. van Ryzin; "Using Multivariate Statistics (5th Edition)" by Barbara G. Tabachnick and Linda S. Fidell; and "Introduction to Operations Research" by Friedrich S. Hiller and Gerald J. Lieberman, McGraw-Hill 7th edition, Mar. 22, 2002; the contents of which are each hereby incorporated by reference in their entireties.

In various embodiments, exemplary network optimization systems include a user interface ("UI"), software modules, logic engines, various databases, interfaces to systems and tools, and/or computer networks. While exemplary network optimization systems may contemplate upgrades or reconfigurations of existing processing systems, changes to existing databases and system tools are not necessarily required by principles of the present disclosure.

The benefits provided by principles of the present disclosure include, for example, increased revenue, increased forecasting accuracy, lower costs, increased seat utilization, increased customer good will, increased planning and operational efficiency, and increased employee morale. For example, a revenue management organization benefits from improved forecasting accuracy and resulting increased revenue. Customers benefit from booking availability that more closely tracks their willingness to pay, increasing the likelihood of a suitable seat and associated fare being available for them.

As used herein: a "fare class" or "class" refers to a group of airline seats that are priced similarly to one another.

An "entity" may include any individual, software program, business, organization, government entity, web site, system, hardware, and/or any other entity.

A "local passenger" or "local booking" is a passenger/booking whose origination point and final destination are covered by a single flight leg. For example, a passenger boarding at LAX (Los Angeles), flying nonstop on a flight from LAX to PHX (Phoenix), and deplaning in PHX is a local passenger for the LAX→PHX flight leg.

A "flow passenger" or "flow booking" is, with respect to a particular flight leg, a passenger/booking whose origination point and final destination are covered via multiple flight legs. For example, a passenger boarding at SFO (San Francisco), flying from SFO to PHX, and then flying from PHX to MCO (Orlando), is a flow passenger for each of the SFO→PHX flight leg and the PHX→MCO flight leg.

A "user" may include any entity that interacts with a system and/or participates in a process.

Turning now to FIG. 1A, in accordance with various embodiments, a user 105 may perform tasks such as requesting, retrieving, receiving, updating, analyzing and/or modifying data. User 105 may also perform task such as initiating, manipulating, interacting with or using a software application, tool, module or hardware, and initiating, receiving or sending a communication. User 105 may interface with Internet server 125 via any communication protocol, device or method discussed herein, known in the art, or later developed. User 105 may be, for example, a member of a revenue management organization, a member of an operations research and systems analysis organization, a downstream system, an upstream system, a third-party system, a system administrator, and/or the like.

In various embodiments, a user 105 may interface with a network optimization system 115 by way of a client 110. Network optimization system 115 may be a partially or fully integrated system comprised of various subsystems, modules and databases. Client 110 comprises any hardware and/or software suitably configured to facilitate entering, accessing, requesting, retrieving, updating, analyzing and/or modifying data. The data may include operational data (e.g., schedules, resources, routes, operational alerts, weather, etc.), passenger data, cost data, forecasts, historical data, verification data, asset (e.g., airplane) data, inventory (e.g., airplane seat) data, legal/regulatory data, authentication data, demographic data, transaction data, or any other suitable information discussed herein.

Client 110 includes any device (e.g., a computer), which communicates, in any manner discussed herein, with network optimization system 115 via any network or protocol discussed herein. Browser applications comprise Internet browsing software installed within a computing unit or system to conduct online communications and transactions. These computing units or systems may take the form of personal computers, mobile phones, personal digital assistants, mobile email devices, laptops, notebooks, hand-held computers, portable computers, kiosks, and/or the like. Practitioners will appreciate that client 110 may or may not be in direct contact with network optimization system 115. For example, client 110 may access the services of network optimization system 115 through another server, which may have a direct or indirect connection to Internet server 125. Practitioners will further recognize that client 110 may present interfaces associated with a software application (e.g., SAS analytic software) or module that are provided to client 110 via application GUIs or other interfaces and are not necessarily associated with or dependent upon internet browsers or internet specific protocols.

User 105 may communicate with network optimization system 115 through a firewall 120, for example to help ensure the integrity of network optimization system 115 components. Internet server 125 may include any hardware and/or software suitably configured to facilitate communications between the client 110 and one or more network optimization system 115 components.

Firewall 120, as used herein, may comprise any hardware and/or software suitably configured to protect network optimization system 115 components from users of other networks. Firewall 120 may reside in varying configurations including stateful inspection, proxy based and packet filtering, among others. Firewall 120 may be integrated as software within Internet server 125, any other network optimization system 115 component, or may reside within another computing device or may take the form of a stand-alone hardware component.

Authentication server 130 may include any hardware and/or software suitably configured to receive authentication credentials, encrypt and decrypt credentials, authenticate credentials, and/or grant access rights according to predefined privileges associated with the credentials. Authentication server 130 may grant varying degrees of application and/or data level access to users based on information stored within authentication database 135 and user database 140. Application server 142 may include any hardware and/or software suitably configured to serve applications and data to a connected client 110.

In accordance with various embodiments, network optimization system 115 is usable to increase and/or maximize revenue, manage inventory strategy, generate inputs to other forecasting systems, and/or the like. Continuing to reference FIG. 1A, network optimization system 115 allows communication with central data repository (CDR) 150, and with various other databases, tools, UIs and systems (not shown in FIG. 1A). Such systems include, for example, airline scheduling systems, passenger booking and reservations systems, revenue management systems, inventory systems, and/or the like.

Network optimization system 115 components are interconnected and communicate with one another to allow for a completely integrated optimization system. In various embodiments, network optimization system 115 separates prior relationships between pricing and inventory stratification tables; network optimization system 115 may instead remap bookings to a flight leg individually (including the respective value of a particular flight leg net of all other displacements in the network). Airline reservations systems may sell inventory based at least in part upon the output of network optimization system 115.

In various embodiments, network optimization system 115 modules (e.g., AU to ENR module 145, demand class remapping module 147, and other network optimization system 115 modules not shown in FIG. 1A) are software modules configured to enable online functions such as sending and receiving messages, receiving query requests, configuring responses, dynamically configuring user interfaces, requesting data, receiving data, displaying data, executing complex processes, calculations, forecasts, mathematical techniques, workflows and/or algorithms, prompting user 105, verifying user responses, authenticating the user, initiating network optimization system 115 processes, initiating other software modules, triggering downstream systems and processes, encrypting and decrypting, and/or the like. Additionally, network optimization system 115 modules may include any hardware and/or software suitably configured to receive requests from client 110 via Internet server 125 and application server 142.

Network optimization system 115 modules may be further configured to process requests, execute transactions, construct database queries, and/or execute queries against databases within network optimization system 115 (e.g., central data repository ("CDR") 150), external data sources and/or temporary databases. In various embodiments, one or more network optimization system 115 modules may be configured to execute application programming interfaces in order to communicate with a variety of messaging platforms, such as email systems, wireless communications systems, mobile communications systems, multimedia messaging service ("MMS") systems, short messaging service ("SMS") systems, and the like.

Network optimization system 115 modules may be configured to exchange data with other systems and application modules, for example an airline reservation system. In various embodiments, network optimization system 115 modules may be configured to interact with other network optimization system 115 components to perform complex calculations, retrieve additional data, format data into reports, create XML representations of data, construct markup language documents, construct, define or control UIs, and/or the like. Moreover, network optimization system 115 modules may reside as standalone systems or tools, or may be incorporated with the application server 142 or any other network optimization system 115 component as program code. As one of ordinary skill in the art will appreciate, network optimization system 115 modules may be logically or physically divided into various subcomponents, such as a workflow engine configured to evaluate predefined rules and to automate processes.

In addition to the components described above, network optimization system 115 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; a plurality of databases, and/or the like.

As will be appreciated by one of ordinary skill in the art, one or more network optimization system 115 components may be embodied as a customization of an existing system, an add-on product, upgraded software, a stand-alone system (e.g., kiosk), a distributed system, a method, a data processing system, a device for data processing, and/or a computer program product. Accordingly, individual network optimization system 115 components may take the form of an entirely software embodiment, an entirely hardware embodiment, or an embodiment combining aspects of both software and hardware. Furthermore, individual network optimization system 115 components may take the form of a computer program product on a non-transitory computer-readable storage medium having computer-readable program code means embodied in the storage medium. Any suitable computer-readable storage medium may be utilized, including magnetic storage devices (e.g., hard disks), optical storage devices, (e.g., DVD-ROM, CD-ROM, etc.), electronic storage devices (e.g., flash memory), and/or the like.

Client 110 may include an operating system (e.g., Windows, UNIX, Linux, Solaris, MacOS, iOS, Windows Mobile OS, Windows CE, Palm OS, Symbian OS, Blackberry OS, J2ME, etc.) as well as various conventional support software and drivers typically associated with mobile devices and/or computers. Client 110 may be in any environment with access to any network, including both wireless and wired network connections. In various embodiments, access is through a network or the Internet through a commercially available web-browser software package. Client 110 and network optimization system 115 components may be independently, separately or collectively suitably coupled to the network via data links which include, for example, a connection to an Internet Service Provider (ISP) over the local loop as is typically used in connection with standard wireless communications networks and/or methods, such as modem communication, cable modem, satellite networks, ISDN, digital subscriber line (DSL), and/or the like. In various embodiments, any portion of client 110 may be partially or fully connected to a network using a wired ("hard wire") connection. As those skilled in the art will appreciate, client 110 and/or any of the system components may include wired and/or wireless portions.

Internet server 125 may be configured to transmit data to client 110, for example within markup language documents. "Data" may include encompassing information such as commands, messages, transaction requests, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users (such as user 105). In various embodiments, Microsoft Internet Information Server (IIS), Microsoft Transaction Server (MTS), and Microsoft SQL Server, are used in conjunction with a Microsoft operating system, Microsoft NT web server software, a Microsoft SQL Server database system, and a Microsoft Commerce Server. In various embodiments, the well-known "LAMP" stack (Linux, Apache, MySQL, and PHP/Perl/Python) are used to enable network optimization system 115. Additionally, components such as Access or Microsoft SQL Server, Oracle, Sybase, InterBase, etc., may be used to provide an Active Data Object (ADO) compliant database management system.

Like Internet server 125, application server 142 may communicate with any number of other servers, databases and/or components through any means known in the art. Further, application server 142 may serve as a conduit between client 110 and the various systems and components of network optimization system 115. Internet server 125 may interface with application server 142 through any means known in the art including a LAN/WAN, for example. Application server 142 may further invoke software modules, such as AU to ENR module 145, demand class remapping module 147, and/or the like, automatically or in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), Flash files or modules, FLEX, ActionScript, extensible markup language (XML), dynamic HTML, cascading style sheets (CSS), helper applications, plug-ins, and/or the like. A server may include a web service that receives a request from a web server, the request including a URL (e.g., http://yahoo.com) and/or an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003).

Continuing to reference FIG. 1A, illustrated are databases that are included in various embodiments. An exemplary list of various databases used herein includes: an authentication database 135, a user database 140, CDR 150 and/or other databases that aid in the functioning of the system. As practitioners will appreciate, while depicted as separate and/or independent entities for the purposes of illustration, databases residing within network optimization system 115 may represent multiple hardware, software, database, data structure and networking components. Furthermore, embodiments are not limited to the databases described herein, nor do embodiments necessarily utilize each of the disclosed databases.

Authentication database 135 may store information used in the authentication process such as, for example, user identifiers, passwords, access privileges, user preferences, user statistics, and the like. User database 140 maintains user information and credentials for network optimization system 115 users (e.g., user 105).

In various embodiments, CDR 150 is a data repository that may be configured to store a wide variety of comprehensive data for network optimization system 115. While depicted as a single logical entity in FIG. 1A, those of skill in the art will appreciate that CDR 150 may, in various embodiments, consist of multiple physical and/or logical data sources. In various embodiments, CDR 150 stores operational data, schedules, resource data, asset data, inventory data, personnel information, routes and route plans, station (e.g., airports or other terminals) data, operational alert data, weather information, passenger data, reservation data, cost data, optimization results, booking class data, forecasts, historical data, verification data, authentication data, demographic data, legal data, regulatory data, transaction data, security profiles, access rules, content analysis rules, audit records, predefined rules, process definitions, financial data, and the like. For example, in various exemplary embodiments a data source or component database of CDR 150 includes information such as unconstrained cabin demand forecasts, unconstrained class-level demand forecasts, cabin achievable demand, cabin current booked count, cabin seat availability, class-level average fare, sell-up percentage, seat respective network revenue, seat respective displacement value, network-revenue ratio, market-value table entry, filed fare by class-code information, and/or the like.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of network optimization system 115 may consist of any combination thereof at a single location or at multiple locations, wherein each database or system includes any of various suitable security features, such as firewalls, access codes, encryption, decryption, compression, decompression, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, Flash, ActionScript, FLEX, VBScript, Macromedia Cold Fusion, COBOL, Microsoft Active Server Pages, assembly, PERL, SAS, PHP, awk, Python, Visual Basic, SQL Stored Procedures, PL/SQL, any UNIX shell script, and/or extensible markup language (XML) or the like, with the various algorithms being implemented with any combination of data structures, objects, processes, routines or other programming elements. Further, it should be noted that the system may employ any number of conventional techniques for data transmission, signaling, data processing, network control, and the like. Still further, the system may be used to detect or prevent security issues with a client-side scripting language, such as JavaScript, VBScript or the like.

Software elements may be loaded onto a general purpose computer, special purpose computer, or other programmable data processing apparatus to produce a machine, such that the instructions that execute on the computer or other programmable data processing means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified herein or in flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

With continued reference to FIG. 1A, in various embodiments, user 105 logs onto an application (e.g., a module) and Internet server 125 may invoke an application server 142. Application server 142 invokes logic in the network optimization system 115 modules by passing parameters relating to user's 105 requests for data. Network optimization system 115 manages requests for data from network optimization system 115 modules and/or communicates with other system components. Transmissions between user 105 and Internet server 125 may pass through a firewall 120 to help ensure the integrity of network optimization system 115 components. Practitioners will appreciate that exemplary embodiments may incorporate any number of security schemes or none at all. In various embodiments, Internet server 125 receives requests from client 110 and interacts with various other network optimization system 115 components to perform tasks related to requests from client 110.

Internet server 125 may invoke an authentication server 130 to verify the identity of user 105 and assign roles, access rights and/or permissions to user 105. In order to control access to the application server 142 or any other component of network optimization system 115, Internet server 125 may invoke an authentication server 130 in response to user 105 submissions of authentication credentials received at Internet server 125. In response to a request to access network optimization system 115 being received at Internet server 125, Internet server 125 determines if authentication is required and transmits a prompt to client 110. User 105 enters authentication data at client 110, which transmits the authentication data to Internet server 125. Internet server 125 passes the authentication data to authentication server 130 which queries the user database 140 for corresponding credentials. In response to user 105 being authenticated, user 105 may access various applications and their corresponding data sources.

Figure 1B:
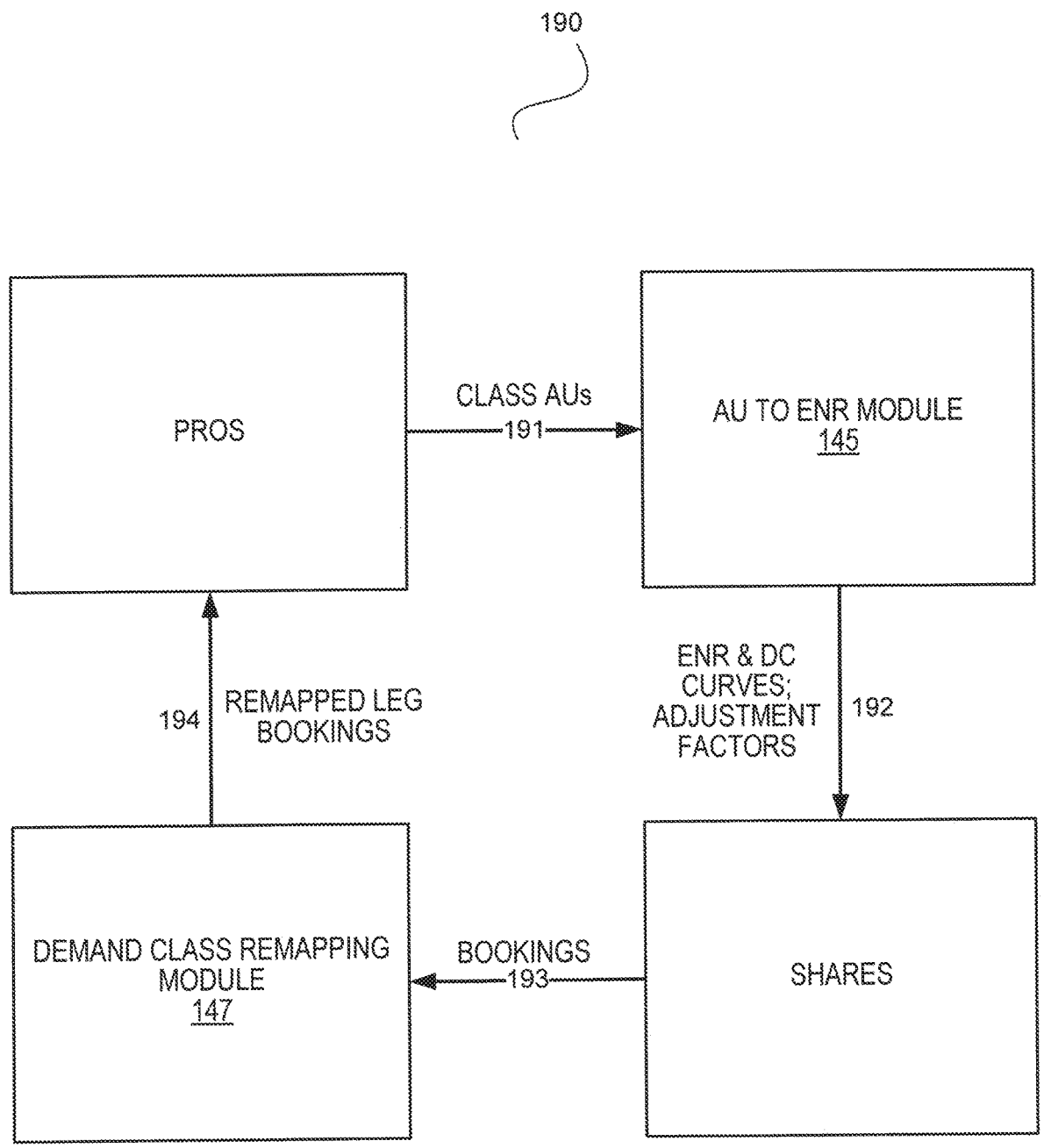
FIG. 1B illustrates data flow in an exemplary network optimization system in accordance with various embodiments.

With reference now to FIGS. 1A and 1B, various prior approaches to airline demand forecasting have suffered from various shortcomings, for example inaccuracies arising from using revenue booking designators (fare classes) for forecasting.

In contrast, principles of the present disclosure contemplate approaches to airline demand forecasting, wherein demand may be viewed from a leg perspective, while passengers are valued from a network perspective. Moreover, principles of the present disclosure contemplate use of dollar values, rather than strictly class values, in connection with demand forecasting. This approach recognizes that, for purposes of forecasting, a network-level class for a flow passenger may differ from the leg-level class of that flow passenger.

Utilizing principles of the present disclosure, for example according to network optimization systems and methods as disclosed herein, allows an organization (for example, an airline) to obtain a more granular valuation of each resource in the network. Stated another way, principles of the present disclosure provide insight into the opportunity cost of each next seat booking. It will be appreciated that this approach thus corrects, from a network perspective, for potential under-valuation and/or over-valuation of certain flight legs in a particular passenger itinerary.

Systems and methods as disclosed herein provide improved network performance for at least two reasons: (i) they correct for flawed material assumptions in prior models (for example EMSR-A, EMSR-B, and so forth) that cause such prior models to undervalue the opportunity cost associated with a particular seat booking; and (ii) they improve demand forecasting by providing a leg-value-based forecast (resulting in lower error) and by separating forecasting from the pricing revenue booking designator.

In this manner, a particular passenger booking may be assessed in terms of value per flight leg; the value per flight leg may thereafter be translated back into a cluster of values, for example in order to provide input for forecasting systems. Moreover, network optimization system 115 and associated methods allows an organization, for example an airline, to more accurately determine the incremental revenue associated with a particular passenger booking—not just the net revenue for that booking.

With reference now to FIG. 1B, in various exemplary embodiments a method 190 of operation of a network optimization system 115 may be visualized at a high level as follows: a forecasting system (for example, PROS offered by PROS Holdings, Inc., or similar) generates class authorization levels (AUs) (step 191) and provides them to AU to ENR module 145. AU to ENR module 145 generates expected network revenue (ENR) and displacement (DC) curves (step 192), and passes them, together with adjustment factors and/or notification parameters, to a reservation system (for example, SHARES offered by EDS Corporation). SHARES advertises seats for sale based on the input and takes bookings for seats (step 193), and passes the booking information to demand class remapping module 147. Demand class remapping module 147 generates remapped leg bookings to reflect adjusted values of such bookings from a network perspective (step 194) and passes the remapped bookings to a forecasting system (e.g., PROS). The cycle of method 190 repeats, as desired.

Figure 2A:
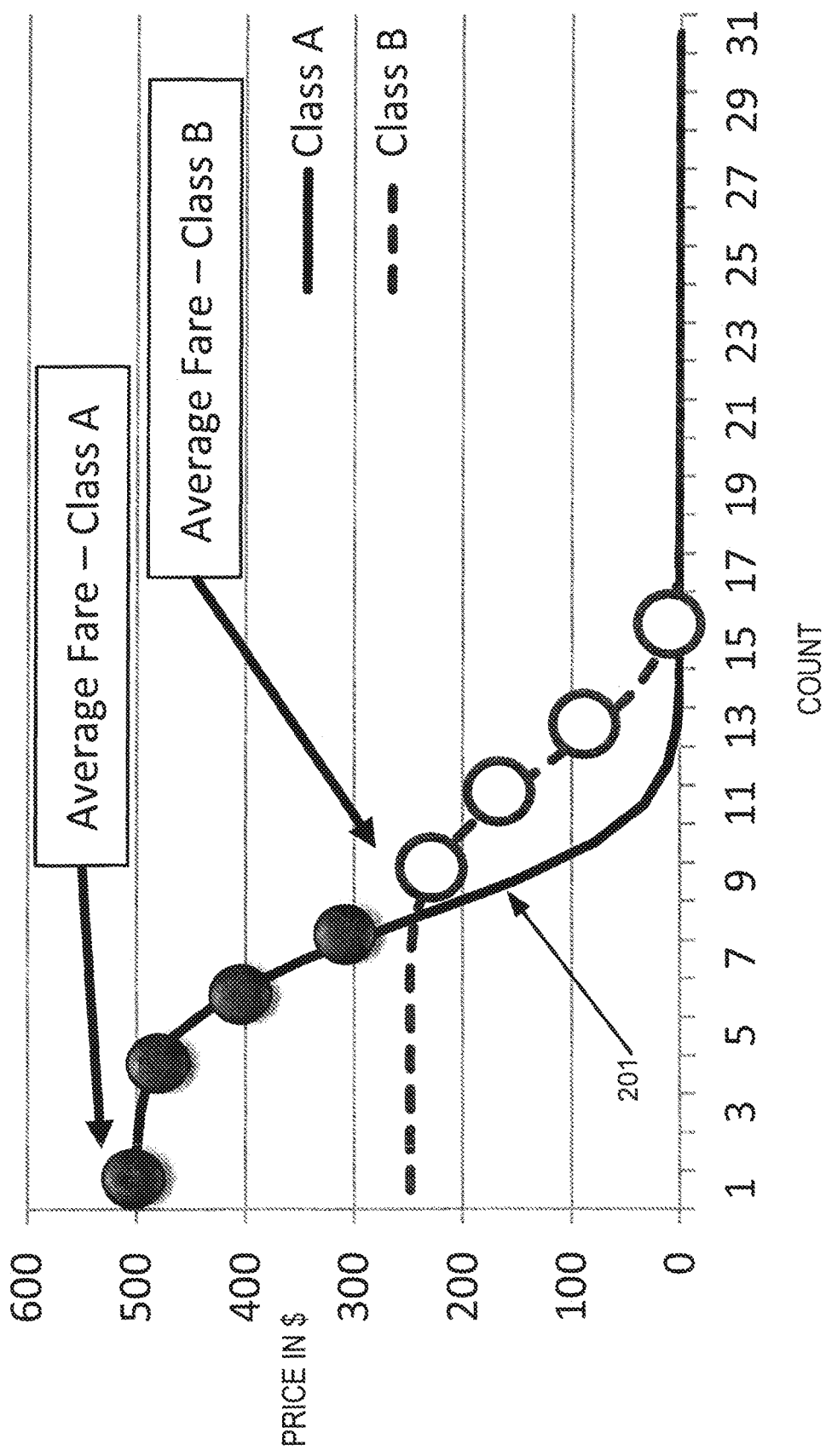
FIG. 2A illustrates a conventional EMSR-like (i.e., probability multiplied by an average fare) approach to generate expected network revenue (ENR) values, illustrating how the conventional method is sub-optimal by only generating values "to the right" of (i.e., equal to or lower than) an actual average fare.

With reference now to FIG. 2A, various prior forecasting approaches, for example EMSR-B, suffer from known imperfections, inaccuracies, and/or errors. For example, using EMSR-B to generate ENR values is known to generate ENR values that fall only "to the right" (i.e., less than) an actual average fare curve (illustrated as curve 201 in FIG. 2A); as illustrated in FIG. 2A, EMSR-B output for class B is always less than the actual average fare curve 201 in that class.

In contrast, principles of the present disclosure contemplate updated methodologies and systems that more accurately values the possible ENRs within a distribution. Network optimization system 115 provides a fit for the distribution curve for network revenue values for a class. Network optimization system 115 may also allocate "seat protects" along the distribution curve according to their adjusted probabilities of selling. Stated another way, via AU to ENR module 145, historic traffic may be converted to a fare class distribution and thereafter to a kernel density estimation. Via kernel density estimation, a quantile may be mapped to a particular network-revenue equivalent dollar value. In various exemplary embodiments, points (i.e., seat protects) may be spread evenly across the kernel density estimator, starting at the $0^{th}$ percentile. It will be appreciated that the spread (the number of points) thus determines the actual quantile, and the quantile may then be mapped to an ENR using a kernel density function.

Figure 2B:
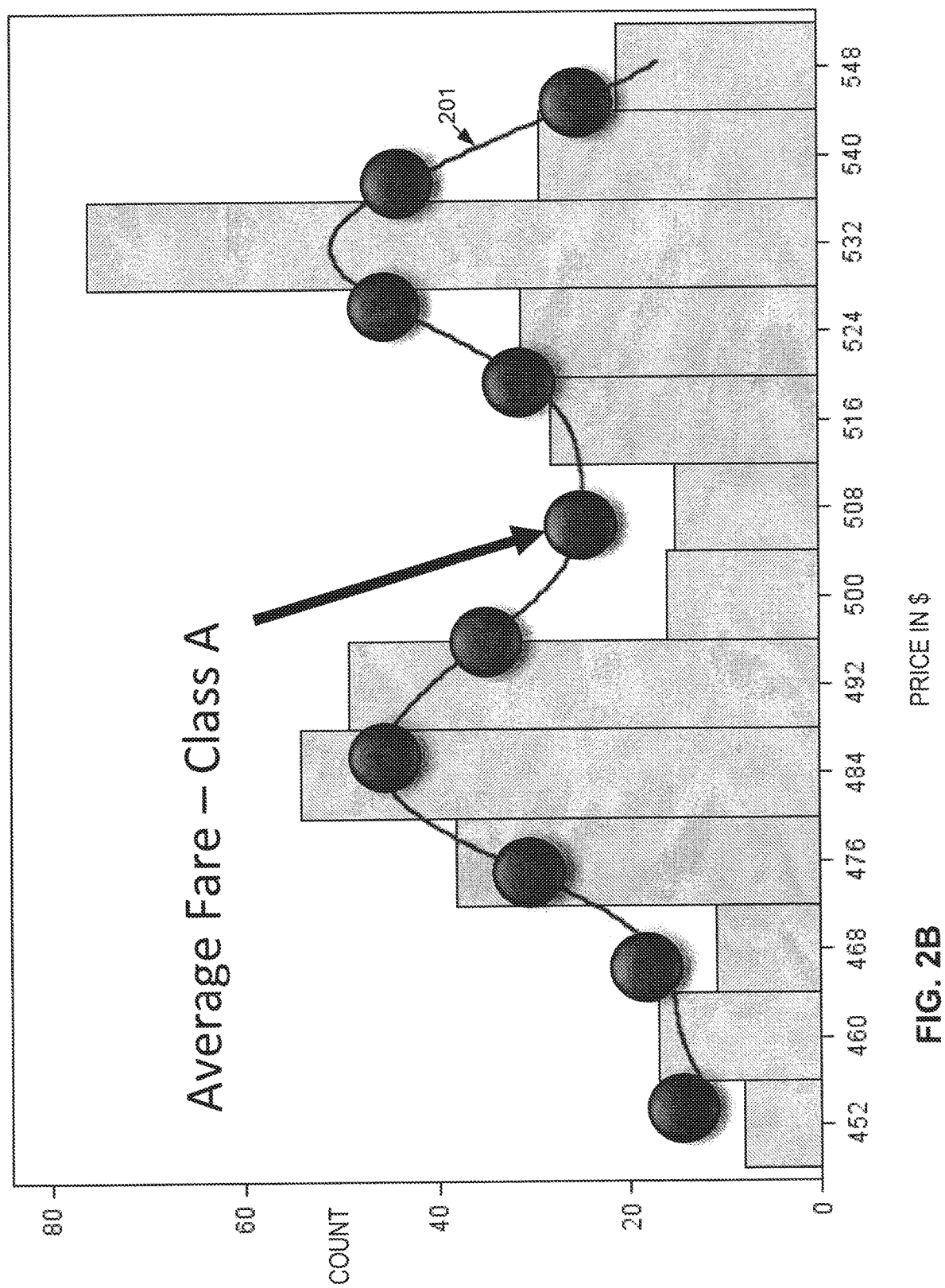
FIG. 2B illustrates exemplary kernel density estimation in connection with generation of ENR values in accordance with various embodiments.
Figure 3A:
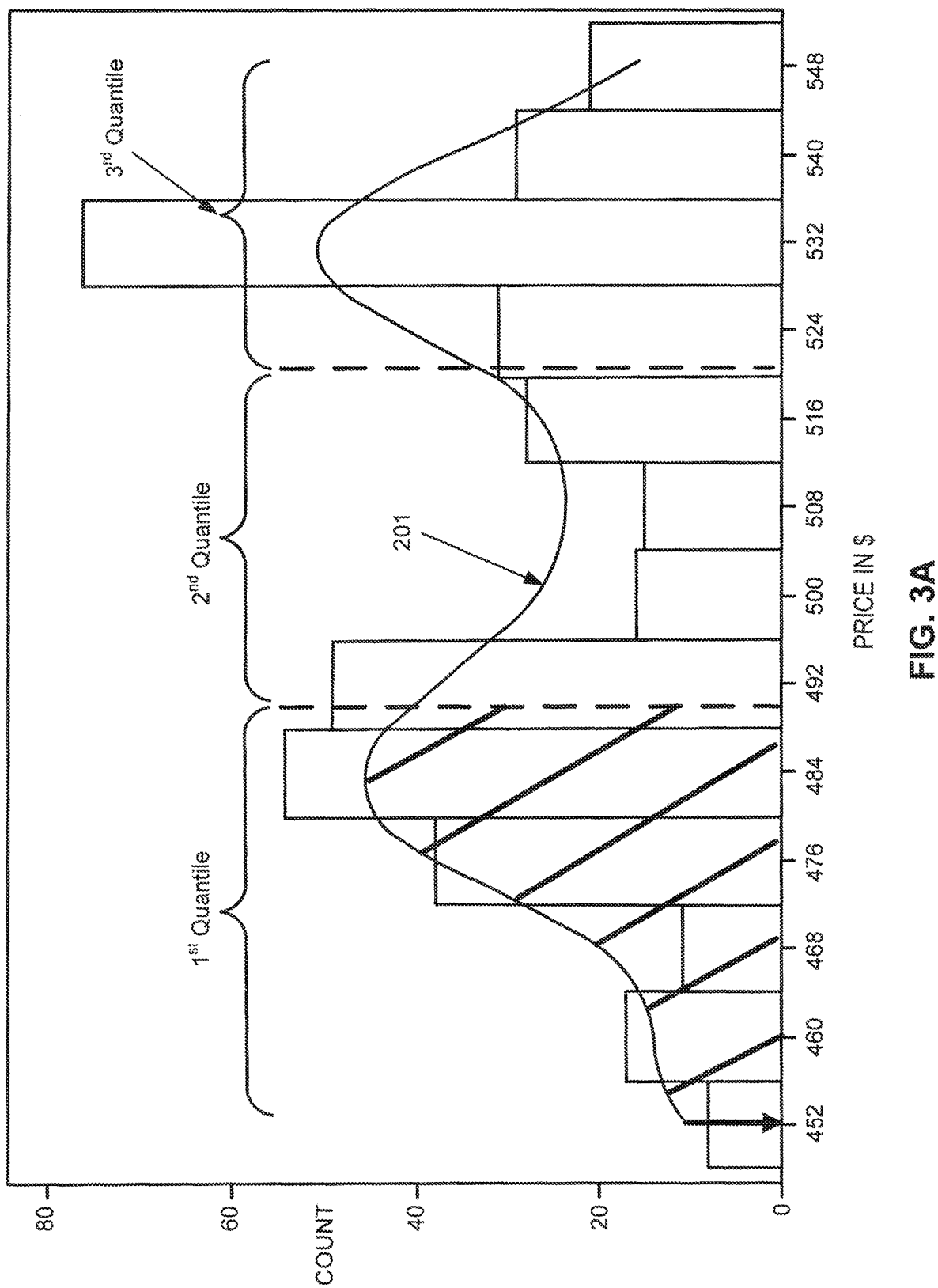
FIG. 3A illustrates kernel density estimation of ENR for an exemplary flight in accordance with various embodiments.

With reference now to FIG. 2B, in various exemplary embodiments AU to ENR module 145 is configured to account for, model, and/or utilize historical bookings information in order to determine a set of quantiles in a particular class. For example, in FIG. 2B historical information for an exemplary fare class, Class A, on an exemplary flight is illustrated. Class A spans fares ranging from $452 to $548, with an average fare of $508. However, it can be seen that historically, fares sold in class A are not equally distributed across the class; rather, more bookings have been taken around certain price points (e.g., $484 and $532, for example), as opposed to other price points (e.g., $452 and $508, for example). Stated another way, fares in class A do not have an equal probability of selling. Accordingly, AU to ENR module 145 is configured to allocate price points for seat protects for a particular class, not by distributing evenly across the class by price point, but by distributing evenly across the class by probability of selling (i.e., by dividing the area under curve 201 into quantiles, for example as illustrated in FIG. 3A).

In various embodiments, AU to ENR module 145 is configured to modify, adjust, and/or convert data from a first set of values into a second set of values. In certain exemplary embodiments, AU to ENR module 145 is configured to receive input from a forecasting system (for example, PROS) in the form of authorization levels (AUs), availability, demand, bookings, and/or the like. AU to ENR module 145 converts the AUs into appropriate expected network revenue (ENR) values. Stated generally, AU to ENR module 145 is configured to provide an answer to the question: "What is the net value to the network of a particular booking on a particular flight leg?"

Figure 4A:
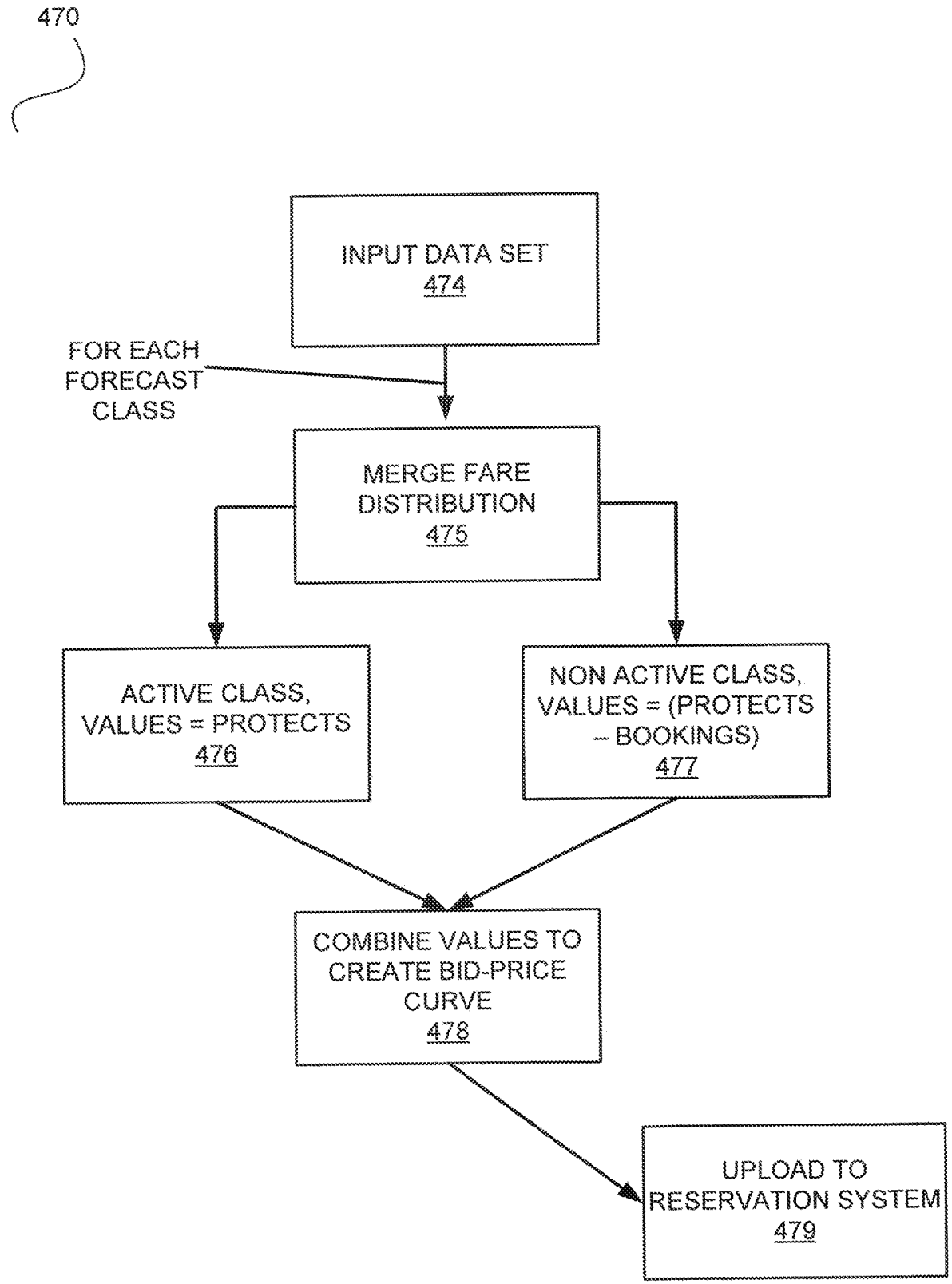
FIG. 4A illustrates an exemplary method for AU to ENR conversion in accordance with various embodiments.
Figure 4B:
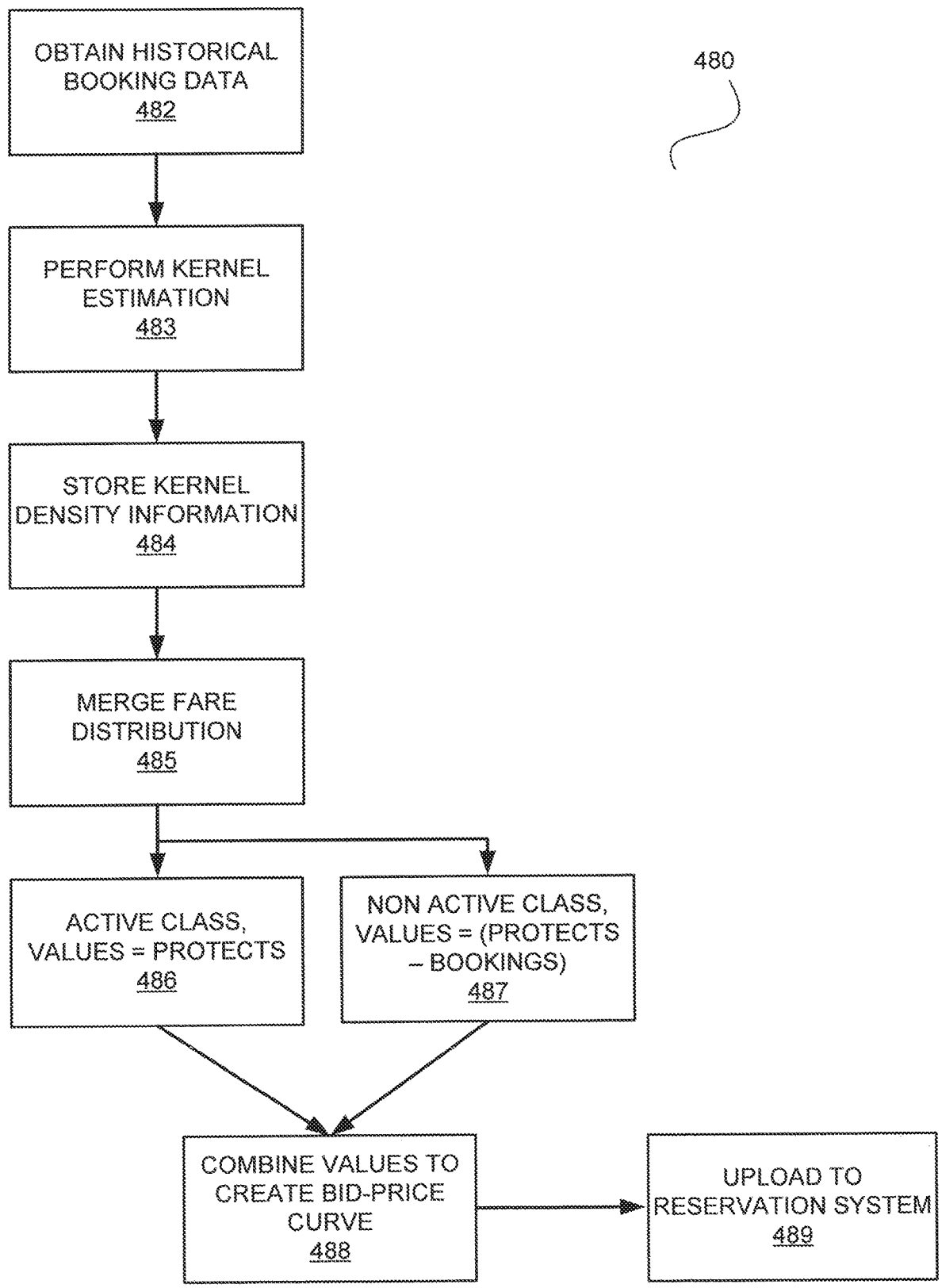
FIG. 4B illustrates an exemplary method for AU to ENR conversion in accordance with various embodiments.

AU to ENR module 145 may be operable on-demand, on a schedule, on a "triggered" basis (for example, each time a trigger event occurs, such as a booking or series of bookings), and/or continuously, as desired, in order to generate ENR values. In various exemplary embodiments, AU to ENR module 145 operates (for example, as illustrated in FIG. 4A in method 470) each time an updated forecast/optimization is desired. In some exemplary embodiments, AU to ENR module 145 operates (for example, as illustrated in FIG. 4B in method 480) on a weekly basis, for example, in order to update and/or refresh fare distribution in an airline network system. AU to ENR module 145 and/or methods 470, 480, and/or 490 may be utilized on any suitable time schedule, as desired.

AU to ENR module 145 may utilize historical data regarding seat bookings for a prior period of time, for example about the prior 12 weeks to about the prior 52 weeks of booking information. Moreover, any suitable amount of historical data may be utilized. AU to ENR module 145 may also utilize information such as traffic volume at the leg level, seat protects and demand at the class level, and/or the like. AU to ENR module 145 may provide ENR values for all classes in a flight leg; alternatively, AU to ENR module 145 may not provide ENR values for certain classes (for example, first class, Y-class, and/or the like).

In various exemplary embodiments, AU to ENR module 145 generates ENR values responsive to inputs comprising AU levels for a flight leg. In certain exemplary embodiments, AU to ENR module 145 utilizes an input process (i.e., finding a distribution of network revenue), an estimation process (i.e., kernel density estimation of network revenue), and a conversion process (i.e., converting AUs/seat protects to expected network revenue). As mentioned previously, AU to ENR module 145 is configured to fit a distribution curve for network revenue values for a class, and thereafter allocate seat protects along the curve according to their adjusted probabilities of selling.

Figure 3B:
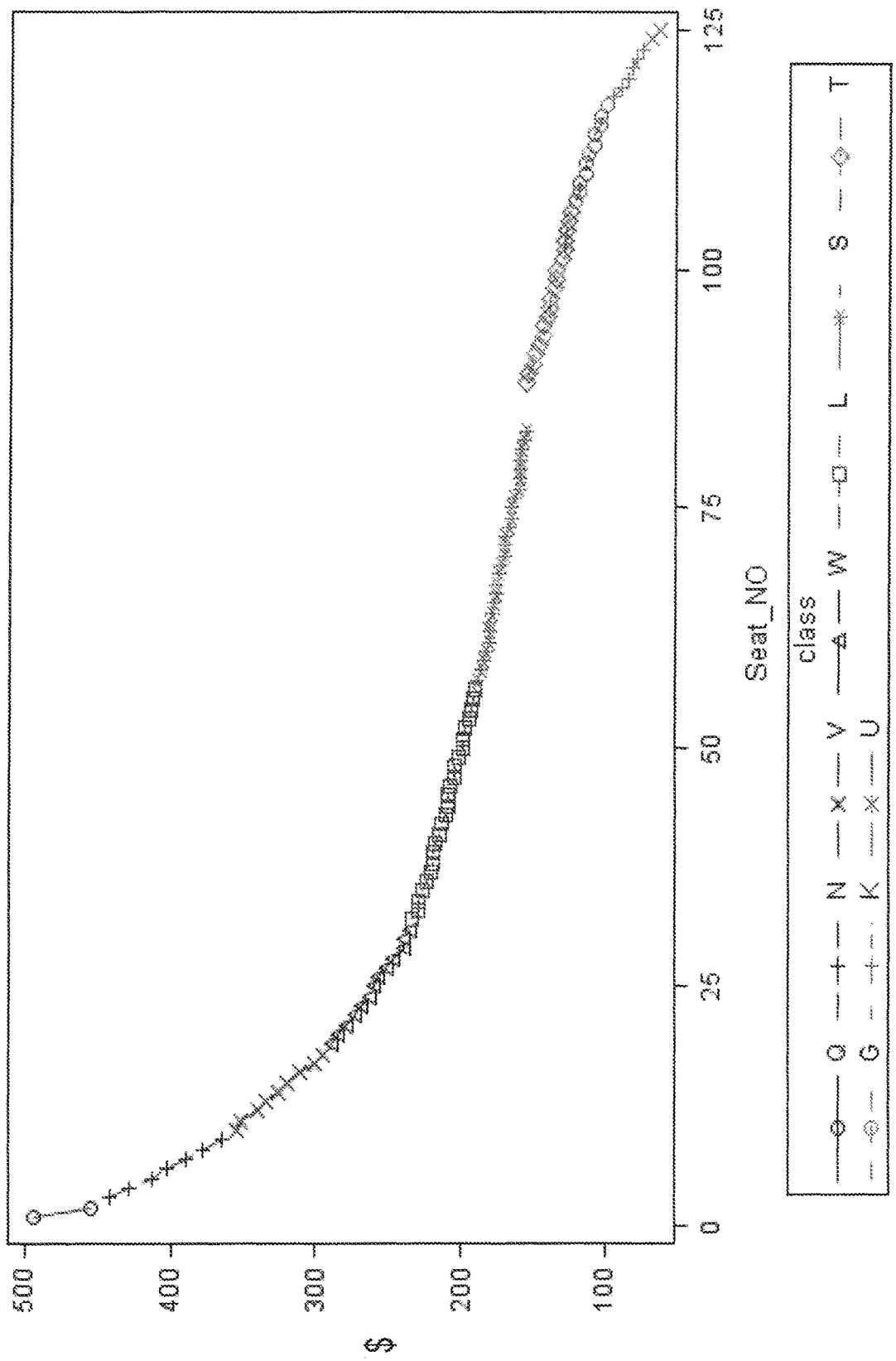
FIG. 3B illustrates a bid-price curve generated by an exemplary authorization level (AU) to ENR module in accordance with various embodiments.
Figure 3C:
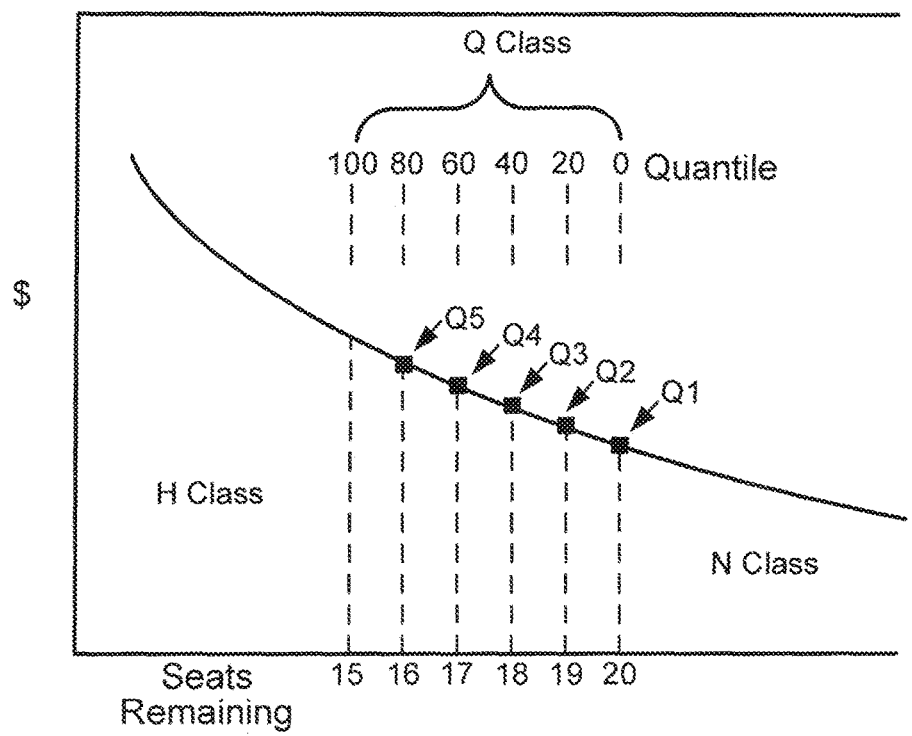
FIGS. 3C through 3F illustrate seat protect allocation and booking in an active class in accordance with various embodiments.

An exemplary bid-price curve generated by AU to ENR module 145 is illustrated in FIG. 3B. An exemplary partial table of output values generated by AU to ENR module 145 is shown below as Table 1.

TABLE 1

| Seat No. | Directional Market | Flight No. | Flight Date | Class | ENR ($) |
|---|---|---|---|---|---|
| 1 | PHX→DTW | 231 | Jul. 27, 2014 | Q | 495 |
| 2 | PHX→DTW | 231 | Jul. 27, 2014 | Q | 455 |
| 3 | PHX→DTW | 231 | Jul. 27, 2014 | N | 442 |
| 4 | PHX→DTW | 231 | Jul. 27, 2014 | N | 429 |
| 5 | PHX→DTW | 231 | Jul. 27, 2014 | N | 413 |
| 6 | PHX→DTW | 231 | Jul. 27, 2014 | N | 403 |
| 7 | PHX→DTW | 231 | Jul. 27, 2014 | N | 389 |
| 8 | PHX→DTW | 231 | Jul. 27, 2014 | N | 378 |
| 9 | PHX→DTW | 231 | Jul. 27, 2014 | N | 365 |
| 10 | PHX→DTW | 231 | Jul. 27, 2014 | V | 355 |
| ... | ... | ... | ... | ... | ... |

* Seat No.: number of seats remaining

In AU to ENR module 145, seat protects in a class may be allocated evenly by quantile, starting at the $0^{th}$ percentile. Thus, for example, when allocating 2 seat protects in a class, AU to ENR module 145 may allocate the first seat protect at the $0^{th}$ percentile, and the second seat protect at the $50^{th}$ percentile. Similarly, when allocating 3 seat protects in a class, AU to ENR module 145 may allocate the first seat protect at the $0^{th}$ percentile, the second seat protect at about the $33^{rd}$ percentile, and the third seat protect at about the $67^{th}$ percentile. As discussed herein, the quantile may correspond with area under a curve, rather than with dollar values. For example, as illustrated in FIG. 3A, it will be understood that a first quantile (for example, from 0-33.3%) may be narrower than, equal to, or wider than a corresponding range of dollar values, depending on the corresponding historical fare distribution. A second quantile (i.e., from 33.3% to 66.6%) and a third quantile (i.e., from 66.6% to 100%) may similarly vary. Stated another way, it will be appreciated that the distribution of fares sold in a class will typically not be evenly distributed by price across the class.

With reference now to FIG. 4A, in various exemplary embodiments a method 470 for AU to ENR conversion comprises obtaining an input data set (step 474), for example a demand forecast from PROS. For each forecast class, AU to ENR module 145 merges the fare distribution (step 475); in the lowest open ("active") class, values are seat protects (step 476) and in each non-active class, values are seat protects less actual bookings (step 477). The values from all classes are combined to create a bid-price curve (step 478), for example as illustrated in FIG. 3B. The results are uploaded to a reservation system (step 479).

Figure 3D:
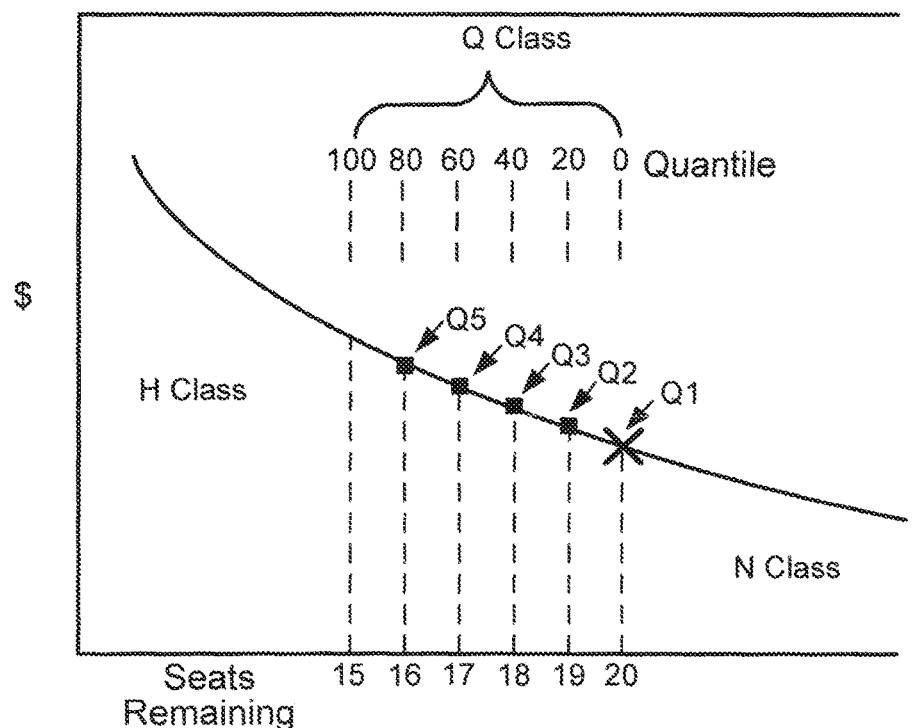
Figure 3E:
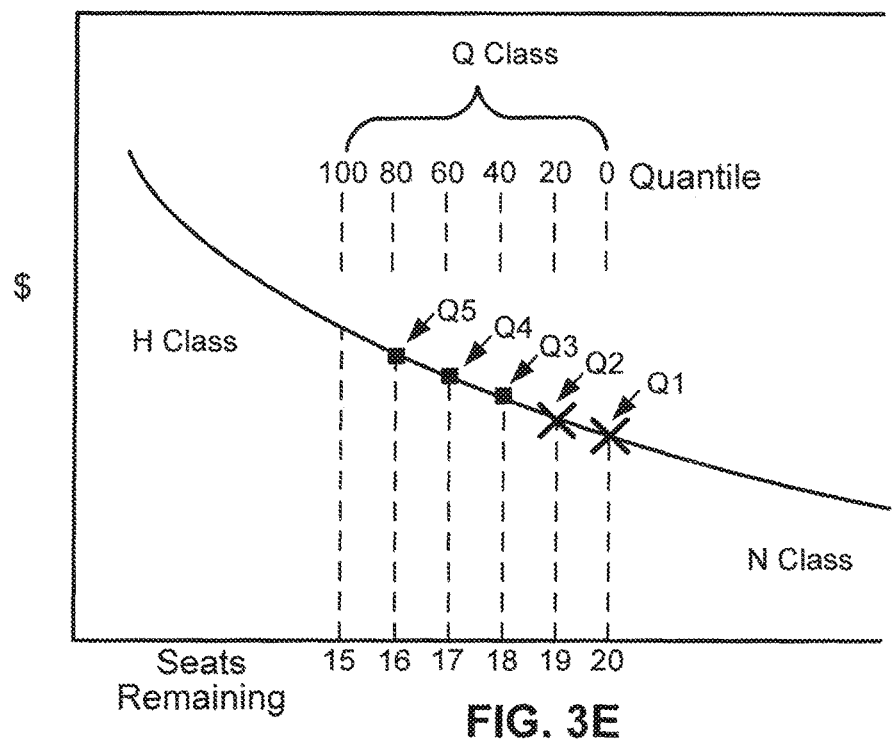
Figure 3F:
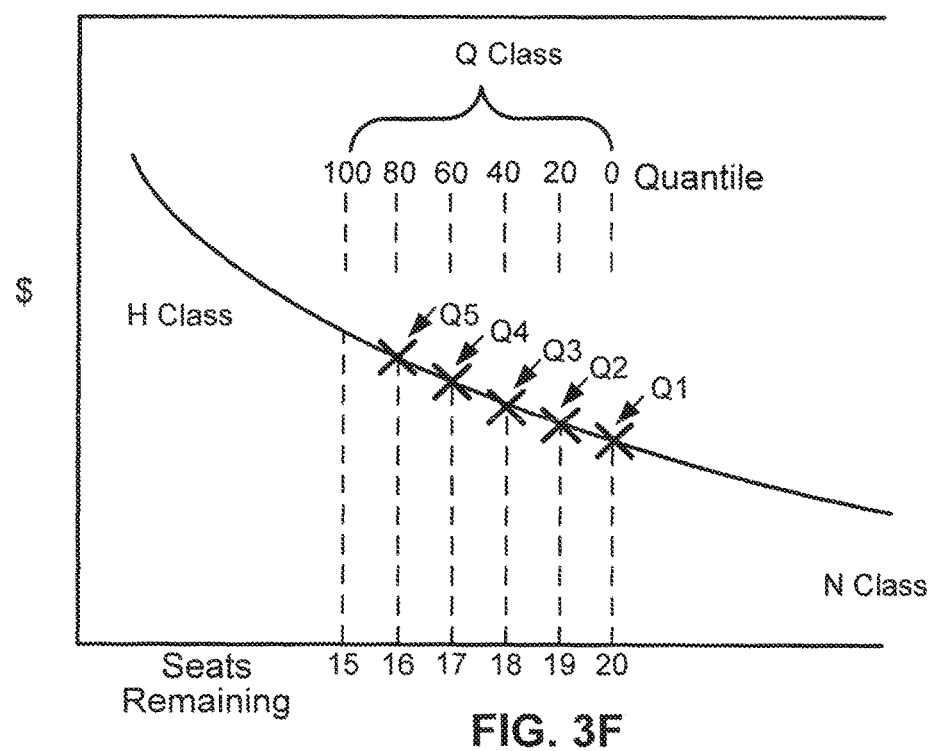
Figure 3G:
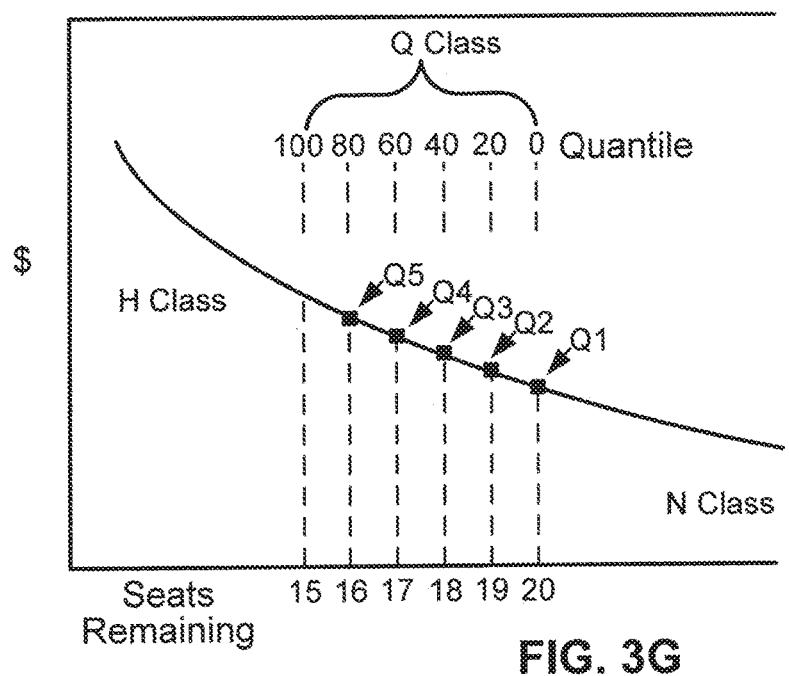
FIGS. 3G through 3L illustrate seat protect allocation, booking, and quantile redistribution in a non-active class in accordance with various embodiments.

Turning now to FIGS. 3C through 3F and FIG. 4A, in various exemplary embodiments, in connection with operation of AU to ENR module 145, when a particular class is the active class, in step 476 bookings are removed/allocated from the bottom up. Stated another way, in an example illustrated in FIGS. 3C through 3F, class Q is the active class and has five available seat protects, Q1 through Q5, evenly distributed by quantile (i.e., by adjusted probability of selling, not by dollar amount spacing) across the Q class range of ENR values (i.e., at the $0^{th}$, $20^{th}$, $40^{th}$, $60^{th}$, and $80^{th}$ percentile). When a booking is taken in Q class, the lowest seat protect on the curve, seat protect Q1 at the $0^{th}$ percentile, is marked as sold (FIG. 3D). When the next booking is taken in Q class, the lowest available remaining seat protect, seat protect Q2 at the $20^{th}$ percentile, is marked as sold (FIG. 3E). Bookings continue to be taken in class Q until the last available seat protect, seat protect Q5 at the $80^{th}$ percentile, is marked as sold and class Q is closed for further bookings (FIG. 3F).

Figure 3H:
Figure 3H:
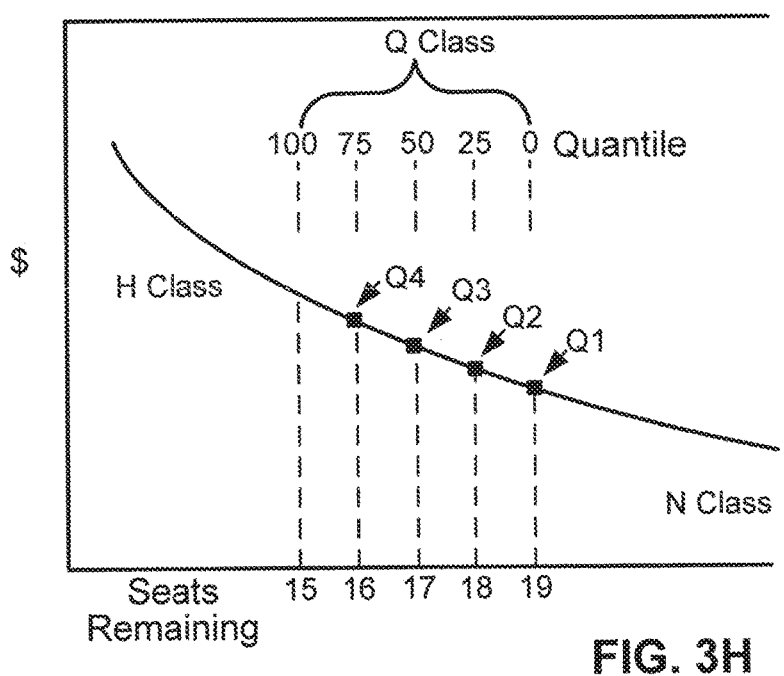
Figure 3I:
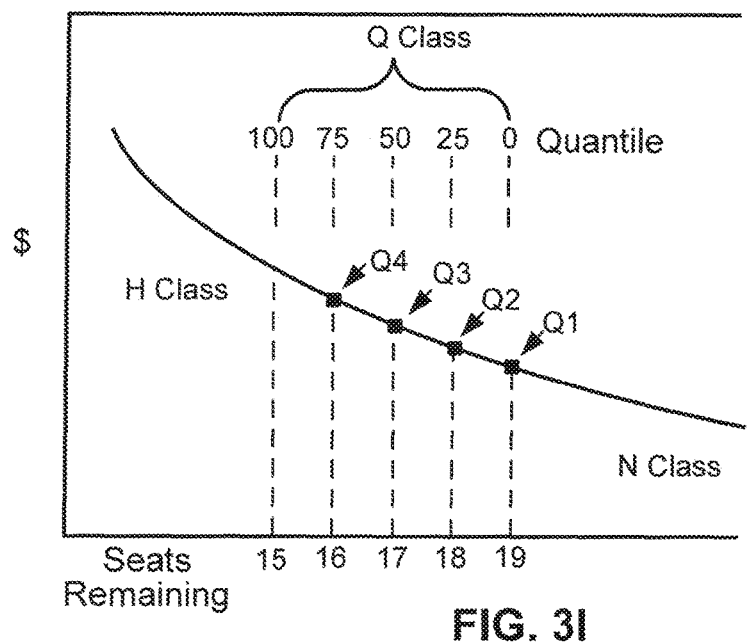
Figure 3J:
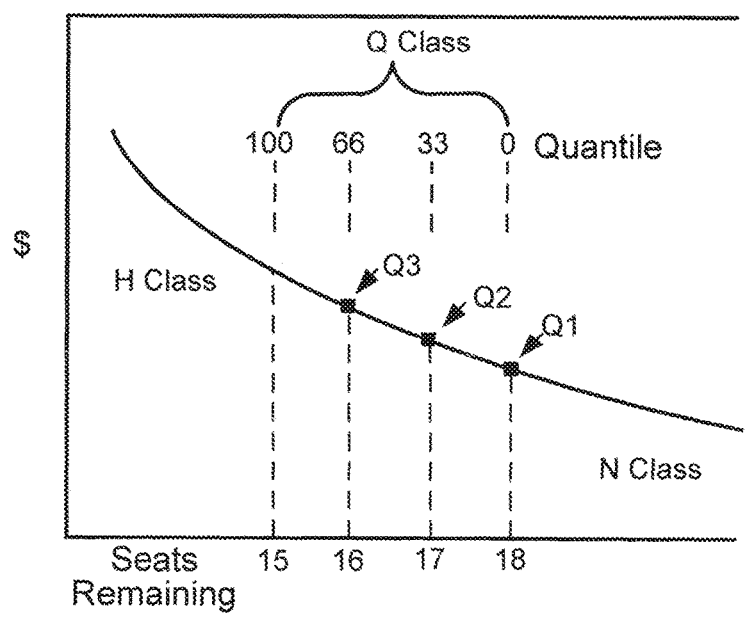
Figure 3K:
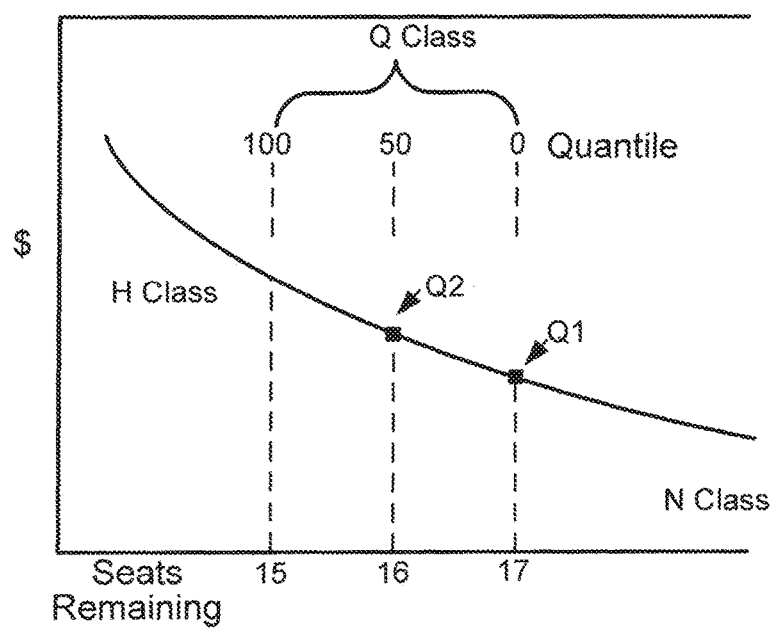
Figure 3L:
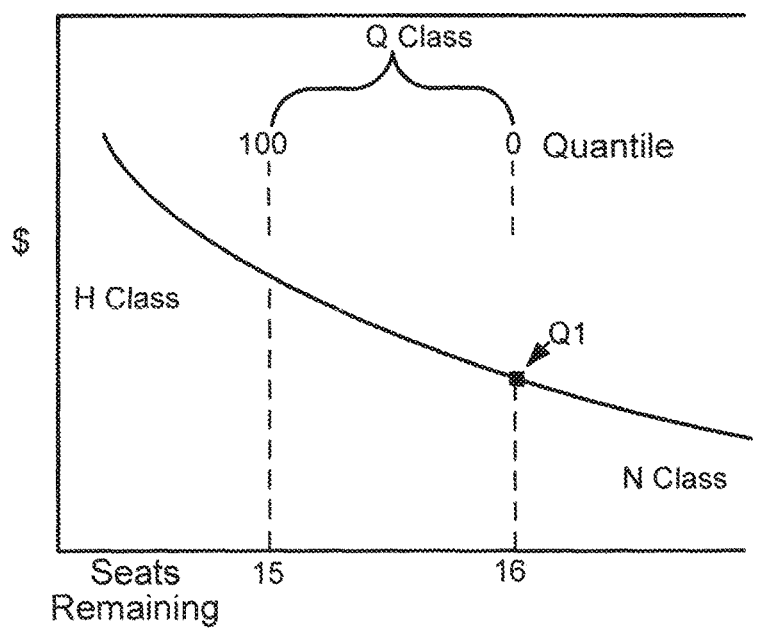

Turning now to FIGS. 3G through 3L and FIG. 4A, in various exemplary embodiments, when a particular class is a non-active class, in step 477 a booking in that class is taken, and the distribution of remaining seat protects is thereafter re-calculated in order to evenly redistribute the remaining seat protects in the class by quantile. Stated another way, in an example illustrated in FIGS. 3G through 3L, class Q is a non-active class and has five available seat protects, Q1 through Q5, evenly distributed by quantile across the Q class range of ENR values. When a particular booking is taken in Q class, a seat protect is marked as sold. The remaining 4 seat protects (now relabeled Q1 through Q4 for convenience) are evenly reallocated across the Q class range of ENR values (i.e., now by quartiles as there are now 4 remaining seat protects, rather than by quintiles as when there were 5 remaining seat protects; stated another way, at the $0^{th}$ percentile, the $25^{th}$ percentile, the $50^{th}$ percentile, and the $75^{th}$ percentile) (FIG. 3H). The process of allocating a seat protect and recalculating the distribution continues as suitable, for example each time a booking is taken or when a forecast is processed (FIGS. 3I through 3L) until all seat protects in class Q are allocated and class Q is closed for further bookings.

When a booking is taken for a particular flight leg, AU to ENR module 145 may re-execute method 470 in order to generate a new bid-price curve for that flight leg.

With reference now to FIG. 4B, in various exemplary embodiments a method 480 for AU to ENR conversion comprises obtaining historical booking information (step 482). Any suitable amount of historical booking information may be utilized, but in various exemplary embodiments, method 480 utilizes between about 12 weeks and about 52 weeks of historical information. AU to ENR module 145 performs kernel estimation (step 483), for example via a non-parametric empirical distribution estimation. The level of detail of the estimation may vary, as desired; however, in certain exemplary embodiments, kernel estimation may be provided based on the day of the week, by flight class, by directional market (e.g., LAX→PHX is a directional market, PHX→LAX is a different directional market, LAX→SFO is yet another directional market, etc), and/or in connection with any other suitable variables or levels of granularity. The kernel estimation is stored (step 484) and thereafter merged with fare distribution information (step 485). AU to ENR module 145 then generates ENR values; similar to method 470, in the active class, values are seat protects (step 486) and for each non-active class, values are seat protects less actual bookings (step 487). The values from the active class and all non-active classes are combined to create a bid-price curve (step 488). The results are uploaded to a reservation system (step 489).

Figure 4C:
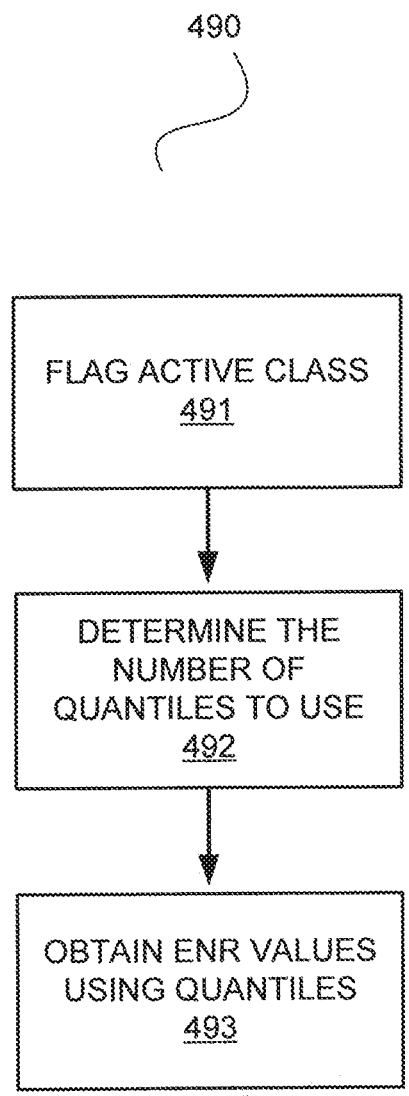
FIG. 4C illustrates an exemplary method for AU to ENR conversion in accordance with various embodiments.

In AU to ENR module 145, AUs and availability may be converted to ENR values. In an exemplary embodiment and with reference to FIG. 4C, in method 490 the active class (the lowest open class) on a flight may be flagged (step 491). For the active class, achievable demand may be utilized. For a non-active class, "pickup" may be utilized, wherein pickup is equal to unconstrained demand less unconstrained bookings. Additional details regarding unconstraining may be found in U.S. patent application Ser. No. 13/791,672 entitled "Demand Forecasting Systems and Methods Utilizing Unobscuring and Unconstraining" filed on Mar. 8, 2013, now U.S. Patent Application Publication 2014-0257925 published on Sep. 11, 2014. The number of seat protects to fit to the curve (i.e., the number of quantiles to use) are determined for each class (step 492). For the active class, the number of quantiles to use is the achievable demand. For each non-active class, the number of quantiles to fit is the pickup. Quantiles are used to perform lookups in a distribution table and reference the corresponding ENR values (step 493).

In various exemplary embodiments, in AU to ENR module 145 or operation thereof, the final number of ENR values needed may differ from the number of quantiles used. In the active class, the number of ENR values equals the number of protects. For each non-active class, the number of ENR values may be the seats remaining within that class. ENR values may be chosen starting from the highest quantile and moving down (for example, with reference to FIG. 3D). In an exemplary embodiment, in the event there are more ENR values needed than quantiles available, all remaining or excess ENR values may be considered to correspond to the $0^{th}$ percentile; stated another way, in certain circumstances more than one ENR value may be considered to correspond to the $0^{th}$ percentile.

Via use of AU to ENR module 145 and/or methods 470, 480, and/or 490, ENR values for passengers may be more accurately assessed. Consequently, improved network decisions may be made, for example seat pricing, fare class allocation, class openings, class closings, and so forth.

In addition to utilizing AU to ENR module 145, network optimization system 115 may be configured to utilize demand class remapping module 147 (and/or method 500) to create, revise, and/or modify demand forecasts and/or to create values suitable for use in a forecast engine. Stated generally, demand class remapping module 147 is configured to translate the value of a booking from the actual price paid by a passenger to a revised value for use in a forecast engine. In various embodiments, demand class remapping module 147 is configured to generate remapped booking information that differs from actual observed bookings. In certain exemplary embodiments, demand class remapping module 147 generates demand forecasts directly; in other exemplary embodiments, remapped booking information generated by demand class remapping module 147 may be delivered to other electronic systems (for example, PROS) in lieu of actual observed booking information, in order to generate improved demand forecasts.

Demand class remapping module 147 and/or method 500 may be utilized on any suitable time schedule, as desired. For example, demand class remapping module 147 may be operable on a weekly basis, on a daily basis, on an hourly basis, on a "triggered" basis (for example, each time a trigger event occurs, such as a booking or series of bookings), after collection of data associated with a data collection point (DCP), and/or the like. In various embodiments, demand class remapping module 147 is operable independent of (and often subsequent to) operation of AU to ENR module 145.

In various exemplary embodiments, demand class remapping module 147 "unpacks" aggregated booking information provided to demand class remapping module 147 as an input (for example, from an airline reservation system, such as SHARES). Demand class remapping module 147 outputs a remapped booking table. The remapped booking table may be utilized as an input to another system, for example a willingness to pay (WTP) system as disclosed in U.S. patent application Ser. No. 13/791,672 entitled "Demand Forecasting Systems and Methods Utilizing Unobscuring and Unconstraining" filed on Mar. 8, 2013, U.S. patent application Ser. No. 13/791,691 entitled "Demand Forecasting Systems and Methods Utilizing Fare Adjustment" filed on Mar. 8, 2013, and U.S. patent application Ser. No. 13/791,711 entitled "Demand Forecasting Systems and Methods Utilizing Prime Class Remapping" filed on Mar. 8, 2013. The remapped booking table may also be utilized as an input to a PROS forecasting system offered by PROS Holdings, Inc. In various exemplary embodiments, demand class remapping module 147 determines network value per flight leg, and then translates the value per flight leg back into class information suitable for use in forecasting.

In demand class remapping module 147, a local passenger booking is mapped/remapped using a forecast stratification table as is known in the art. However, in demand class remapping module 147, a flow passenger booking is mapped/remapped using a network-aware, displacement-adjusted valuation. Stated another way, network optimization system 115 is configured to recognize that forecast stratification and pricing stratification are different; one deals with absolute dollars and the other deals with incremental revenue. Accordingly, demand class remapping module 147 utilizes displacement value information associated with each resource on a network (for example, each seat on an airline flight leg) in order to remap actual bookings, for forecasting purposes, into classes more closely aligned with the actual ENR of such bookings.

Figure 5A:
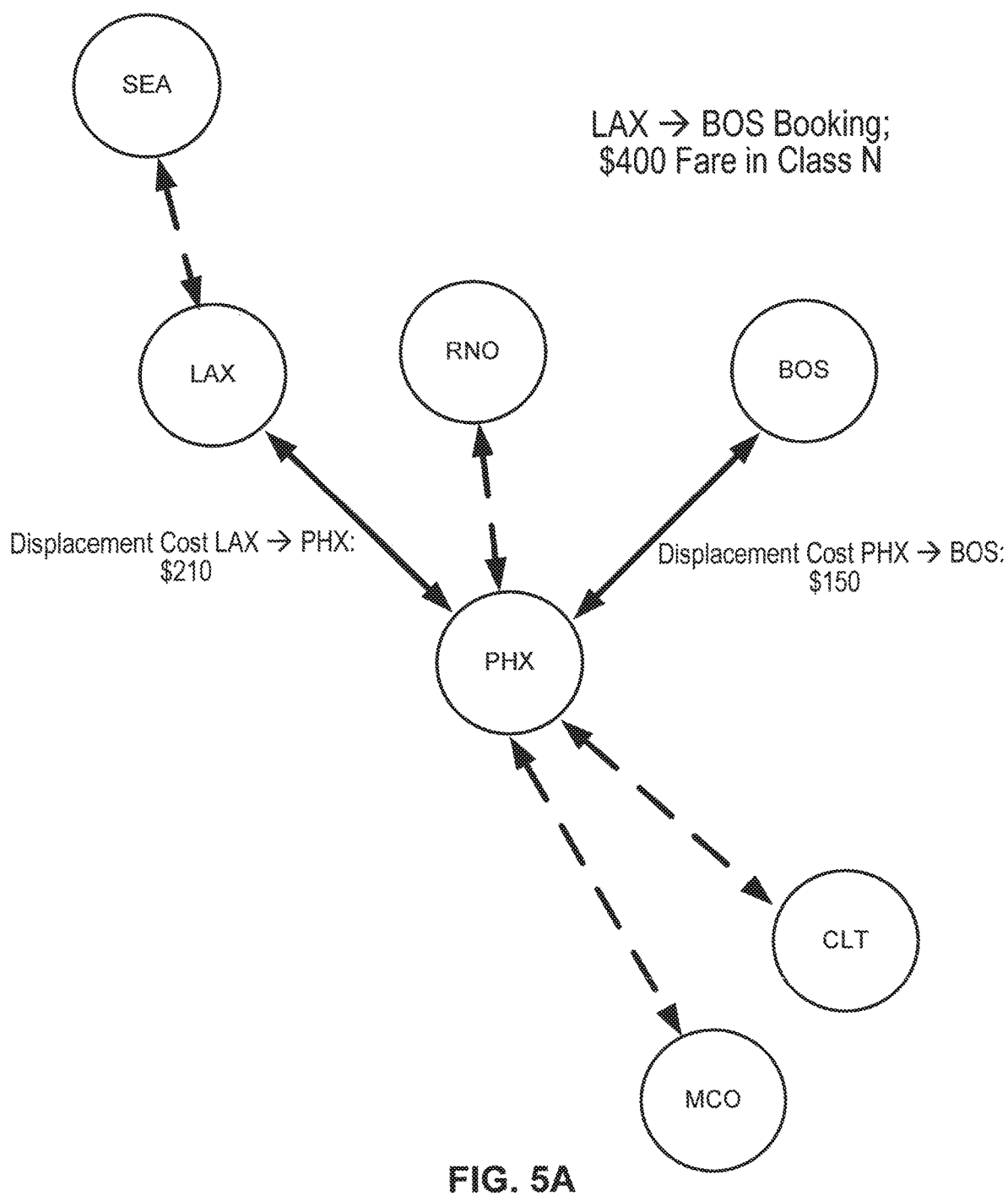
FIG. 5A illustrates demand class remapping for a booking in an exemplary flight in accordance with various embodiments.

To illustrate operation of demand class remapping module 147, consider an exemplary flow passenger booking from LAX→PHX→BOS (Boston) as illustrated in FIG. 5A. The flow passenger booking was taken in N-class at a total ticket price of $400. It will be appreciated that the seat on each leg of the flow booking could otherwise be utilized by other routes/bookings if the present booking had not been made; accordingly, each leg of the flow booking has a displacement cost. For example, the seat on the LAX→PHX leg could have been sold to a passenger travelling from Seattle (SEA) to PHX via LAX. Similarly, the seat on the PHX→BOS leg could have been sold to a passenger travelling from Reno (RNO) to BOS via PHX, and so forth.

In various exemplary embodiments, demand class remapping module 147 may utilize any suitable information, for example bid-price information for each leg of a passenger itinerary, in order to obtain and/or calculate the displacement cost for each leg. In the present example, it is known that the displacement cost of this passenger's seat on the LAX→PHX leg (i.e., the overall network value foregone by selling this seat to this particular passenger) is $210. Similarly, it is known that the displacement cost of this passenger's seat on the PHX→BOS leg is $150.

In various exemplary embodiments, for each flight leg, demand class remapping module 147 determines an appropriate adjusted value for the flight leg utilizing an equation of the form $Leg_n\text{value} = (NR_1/(NR_1+NR_2))*HP+Pricing$, where $NR_1$ = the displacement cost of the seat on a first leg;
$NR_2$ = the displacement cost of the seat on a second leg;
HP = a hurdle point, i.e. the minimum acceptable amount needing to be paid for a booking on the leg in order to cover the displacement cost;
Pricing = ODF−HP; and
ODF = the actual amount paid by a passenger for a booking.

Accordingly, for the illustrated example, the example passenger booking has a value of $250 on the LAX→PHX leg ($400−$150=$250; similarly, as shown by the equation above, Pricing=$400−$360=$40, and $210+$40=$250), and a value of $190 on the PHX→BOS leg ($400−$210=$190). Demand class remapping module 147 thus "remaps", for forecasting purposes, this passenger N-class booking to a class W booking (i.e., a booking having a $250 value) on the LAX→PHX leg and a class S booking (i.e., a booking having $190 value) on the PHX→BOS leg. The remapped booking is provided to a forecasting system in order to generate a forecast. It will be appreciated that the class identifiers and prices utilized in the present disclosure are by way of convenience and example and not by way of limitation; principles of the present disclosure may be utilized for any number of classes and any pricing divisions and/or structures therein or therebetween.

In various exemplary embodiments, demand class remapping module 147 stores remapping information for recall. In this manner, in the event a particular booking is cancelled, an appropriate "unmapping" of the remapped booking can take place. In the given example, if the N-class (as booked in SHARES) example passenger booking is cancelled, a remap lookup table may be utilized; in this instance the remap lookup table would be utilized to remove a class W booking from the LAX→PHX leg and a class S booking from the PHX→BOS leg. In this manner, the remapping process provided by demand class remapping module 147 is reversible, upon demand, in order to account for customer cancellations or other changes within or visible to network optimization system 115.

Figure 5B:
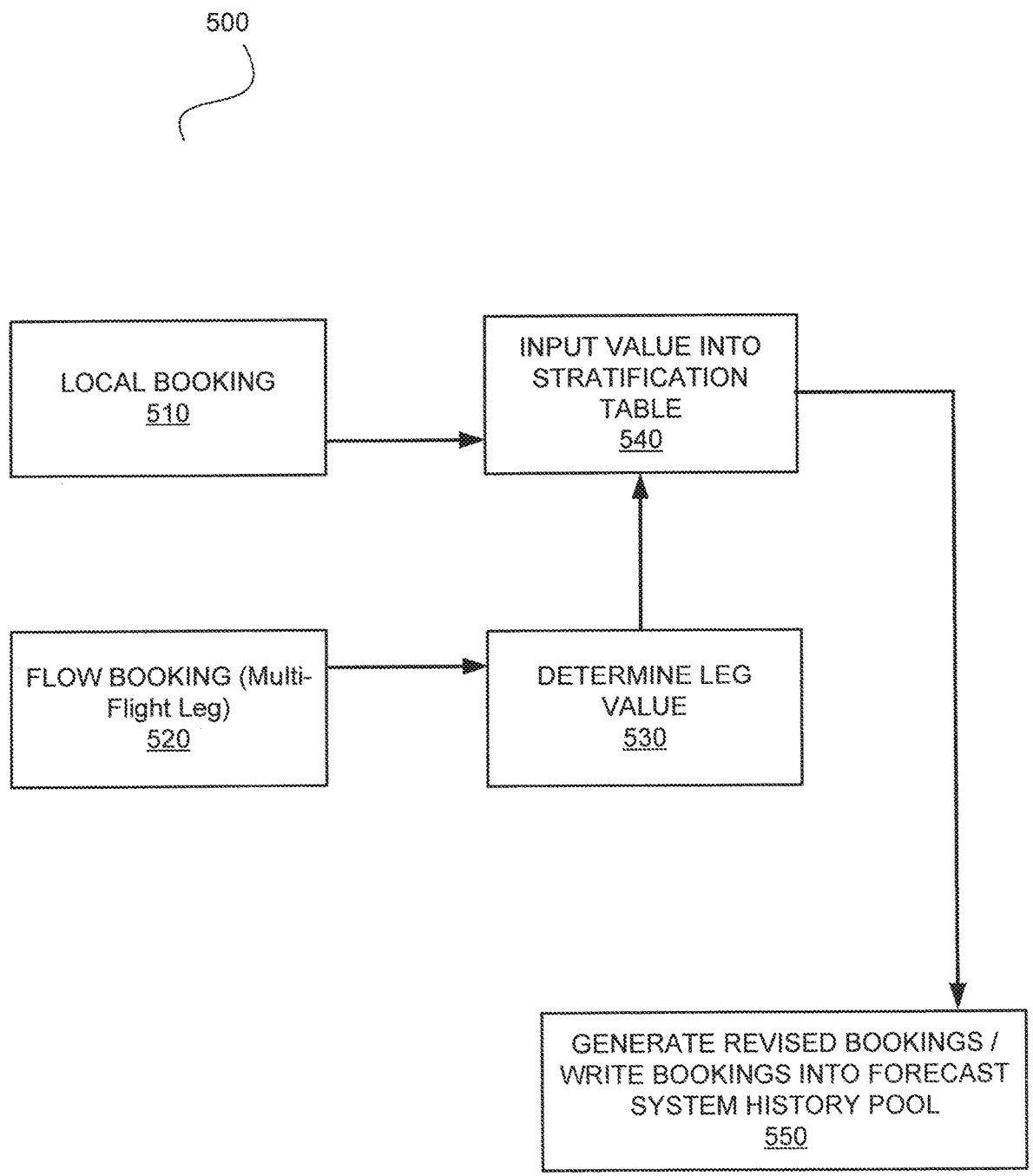
FIG. 5B illustrates a method for demand class remapping in accordance with various embodiments.

With reference now to FIG. 5B, in various exemplary embodiments, a method 500 for demand class remapping comprises identifying local bookings (step 510). Flow bookings are identified (step 520). For each leg in each flow booking, a leg value is determined (step 530). The leg values for each leg in each flow booking are inserted into a stratification table (step 540). Local bookings may also be inserted into the stratification table. The stratification table is utilized to generate remapped bookings for each leg of each flow booking, and the remapped flow bookings, together with the local bookings, are written into a forecast system history pool (step 550). The forecast system history pool may be consulted and/or utilized by other components of network optimization system 115 and/or by external systems, for example for forecasting purposes.

In various embodiments, through use of AU to ENR module 145 and/or demand class remapping module 147, airlines may implement revisions to their booking strategies. In many instances, airlines may reallocate pricing associated with a particular seat on a particular flight leg. Stated differently, after assessing the improved estimated demand information provided and/or facilitated by network optimization system 115, airlines may reprice certain seats that, while contributing to gross revenue when booked, actually generate negative marginal revenue. Additional seats may thus be booked in a manner that is marginal-revenue-positive for the airline.

Principles and features of the present disclosure may suitably be combined with principles of revenue management, for example as disclosed in U.S. patent application Ser. No. 13/348,417 filed on Jan. 11, 2012, now U.S. Pat. No. 8,600,787 entitled "Dynamic Cost Analysis and Overbooking Optimization Methods and Systems" which is incorporated herein by reference in its entirety.

Principles and features of the present disclosure may also suitably be combined with principles of reserve forecasting, for example as disclosed in U.S. patent application Ser. No. 13/793,049 entitled "Reserve Forecasting Systems and Methods" filed on Mar. 11, 2013, now U.S. Patent Application Publication 2014-0257900 published on Sep. 11, 2014, which is incorporated herein by reference in its entirety.

Principles and features of the present disclosure may also suitably be combined with principles of operational reliability, for example as disclosed in U.S. patent application Ser. No. 13/966,723 entitled "Operational Reliability Systems and Methods" filed on Aug. 14, 2013, now U.S. Pat. No. 9,135,670 issued on Sep. 15, 2015, which is incorporated herein by reference in its entirety.

Principles of the present disclosure may suitably be combined with principles of forecasting, demand modeling, and/or the like, for example as disclosed in U.S. patent application Ser. No. 13/791,672 entitled "Demand Forecasting Systems and Methods Utilizing Unobscuring and Unconstraining" filed on Mar. 8, 2013, now U.S. Patent Application Publication 2014-0257925 published on Sep. 11, 2014, U.S. patent application Ser. No. 13/791,691 entitled "Demand Forecasting Systems and Methods Utilizing Fare Adjustment" filed on Mar. 8, 2013, now U.S. Patent Application Publication 2014-0257881 published on Sep. 11, 2014, and U.S. patent application Ser. No. 13/791,711 entitled "Demand Forecasting Systems and Methods Utilizing Prime Class Remapping" filed on Mar. 8, 2013, now U.S. Patent Application Publication 2014-0257882 published on Sep. 11, 2014, each of which are incorporated herein by reference in their entirety.

Principles and features of the present disclosure may also suitably be combined with principles of departure sequencing, for example as disclosed in U.S. patent application Ser. No. 13/833,761 entitled "Departure Sequencing Systems and Methods" filed on Mar. 15, 2013, now U.S. Patent Application Publication 2014-0278036 published on Sep. 18, 2014, which is incorporated herein by reference in its entirety.

Principles and features of the present disclosure may also suitably be combined with principles of misconnect management, for example as disclosed in U.S. patent application Ser. No. 13/837,462 entitled "Misconnect Management Systems and Methods" filed on Mar. 15, 2013, now U.S. Patent Application Publication 2014-0278615 published on Sep. 18, 2014, which is incorporated herein by reference in its entirety.

While the present disclosure may be described in terms of an airport, an aircraft, a pilot, and so forth, one skilled in the art can appreciate that similar features and principles may be applied to other transportation systems and vehicles such as, for example, buses, trains, ships, trucks, automobiles and/or the like.

While the exemplary embodiments described herein are described in sufficient detail to enable those skilled in the art to practice principles of the present disclosure, it should be understood that other embodiments may be realized and that logical and/or functional changes may be made without departing from the spirit and scope of the present disclosure. Thus, the detailed description herein is presented for purposes of illustration and not of limitation.

For the sake of brevity, conventional data management, computer networking, statistical assessment, software application development, and other aspects of exemplary systems and methods (and components thereof) may not be described in detail herein. Furthermore, the connecting lines shown in the various figures contained herein are intended to represent functional relationships and/or physical or communicative couplings between the various elements. It should be noted that many alternative or additional functional relationships or physical connections may be present in a practical forecasting system.

While the description references specific technologies, system architectures and data management techniques, practitioners will appreciate that this description is of various embodiments, and that other devices and/or methods may be implemented without departing from the scope of principles of the present disclosure. Similarly, while the description references a user interfacing with the system via a computer user interface, practitioners will appreciate that other interfaces may include mobile devices, kiosks and handheld devices such as mobile phones, smart phones, tablet computing devices, etc.

While the steps outlined herein represent exemplary embodiments of principles of the present disclosure, practitioners will appreciate that there are any number of computing algorithms and user interfaces that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating exemplary embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method comprising:

opening, by a processor, a plurality of seats for a flight leg booking in a fare class for a flight leg of an airline flight;

allocating, by the processor, first seat protects to the flight leg booking based on a probability of selling the flight leg booking;

providing, by the processor to a mobile device of a passenger, the flight leg booking of a seat on the flight leg from the plurality of seats;

receiving, by the processor and from the mobile device of the passenger, a request for the flight leg booking of the seat on the flight leg;

generating, by the processor, an electronic ticket voucher having an authorization parameter and the flight leg booking based on the flight leg booking of the seat on the flight leg;

closing, by the processor, the plurality of seats for the flight leg booking in the fare class for the flight leg of the airline flight;

determining, by the processor and based on a set of class authorization level (AU) values, a set of expected network revenue (ENR) values, wherein the determining the set of expected network revenue (ENR) values comprises:

determining, by the processor and for the fare class in the airline flight, a number of seat protects to fit to a bid-price curve;

determining, by the processor and for the fare class, even-spaced quantile based upon the number of seat protects to fit in the fare class; and generating, by the processor and using a distribution table, a set of ENR values based on the even-spaced quantile for the seat;

determining, by the processor and based on the set of ENR values, a set of revised class AU values;

remapping, by the processor and based on a network value of the flight leg in a set of flight leg bookings, the set of flight leg bookings to form a set of remapped flight leg bookings, wherein the set of flight leg bookings are generated based on the set of revised class AU values;

iteratively updating, by the processor, the flight leg booking on the electronic ticket voucher based on the authorization parameter, the closing of the plurality of seats for the flight leg booking in the fare class, a number of the seat protects, the remapped set of the flight leg bookings and the set of revised class AU values;

determining, by the processor, an impact of a denied boarding on airline flights that are scheduled for departure during a time period;
iteratively updating, by the processor, the impact of the denied boarding during predetermined intervals;
adjusting, by the processor and based on the updating of the impact of the denied boarding, the authorization parameter on the electronic ticket voucher to provide a different voucher amount for the passenger on the airline flights based on latest conditions during a latest time period; and
improving, by the processor, network performance by:
analyzing a value of certain flight legs in a passenger itinerary to obtain more accurate data by avoiding under-valuation and over-valuation of the flight leg booking; and
separating enhanced demand forecasting from fare classes to reduce errors and reduce inaccurate data that slows down the network performance.

2. The method of claim 1, wherein the processor interfaces with a system, wherein the system comprises at least one of an airline scheduling system, a passenger booking and reservations system, a revenue management system, an inventory system, an upgrade analyzer, an optimizer, a cost engine or a no-show forecaster.

3. The method of claim 1, further comprising improving, by the processor, the network performance by valuing an opportunity cost associated the flight leg booking from the fare class, such that the errors are reduced based on the enhanced demand forecasting, and by separating the enhanced demand forecasting from a pricing revenue booking designator.

4. The method of claim 1, wherein the number of seat protects exceeds a number of quantiles, and wherein at least two seat protects are allocated to the even-spaced quantile corresponding to a $0^{th}$ percentile.

5. The method of claim 1, further comprising determining, via a non-parametric empirical distribution estimation, a distribution of revenue for the fare class.

6. The method of claim 1, wherein responsive to the fare class being an active class, a number of quantiles is an achievable demand for the active class.

7. The method of claim 1, wherein responsive to the fare class being a non-active class, a number of quantiles is a pickup, wherein the pickup is equal to unconstrained demand less unconstrained bookings.

8. The method of claim 1, further comprising updating, responsive to a booking occurring in the fare class, the number of seat protects to fit to the bid-price curve for the fare class.

9. The method of claim 8, further comprising, responsive to the fare class being an active class, allocating the booking to a lowest priced seat protect in the fare class.

10. The method of claim 8, wherein the updated number of seat protects are evenly distributed across the fare class by the even-spaced quantile.

11. The method of claim 1, further comprising:
storing, by the processor, the set of class AU values in a database;
tuning, by the processor, the database to optimize performance of the database,
wherein the tuning includes placing frequently used files on separate file systems to reduce in and out bottlenecks;
providing, by the processor, based on a security profile, access to the set of class AU values;
designating, by the processor, a type of the set of class AU values as a key field in a plurality of related data tables to speed searching for the set of class AU values;
linking, by the processor, the plurality of related data tables based on the type of the set of class AU values in key fields;
sorting, by the processor, the set of class AU values according to a known order to simplify a lookup process; and
obtaining, by the processor, the set of class AU values from the database.

12. The method of claim 1, further comprising:
determining, by the processor, a change to the authorization parameter for other passengers for the denied boarding for the airline flight;
adjusting, by the processor and based on the change to the authorization parameter, the authorization parameter on the electronic ticket voucher to create an adjusted authorization parameter, wherein the adjusted authorization parameter provides access to an alternate accommodation flight in a same directional market for the passenger, based on the latest conditions during the latest time period and based on the change to the authorization parameter for the other passengers for the denied boarding for the airline flight;
determining, by the processor, that the alternate accommodation flight is a number of hours passed the airline flight; and
adjusting, by the processor, the authorization parameter on the electronic ticket voucher, wherein the adjusted authorization parameter provides access to hotel, meal and transportation (HMT) services due to the number of hours to the alternate accommodation flight, in response to denied boarding based on revising of booking strategies and the closing the plurality of seats in the fare class.

13. The method of claim 1, wherein the set of class AU values were generated by a forecasting system external to a network optimization system.

14. A system comprising:
a processor; and
a tangible, non-transitory memory configured to communicate with the processor,
the tangible, non-transitory memory having instructions stored thereon that, in response to execution by the processor, cause the processor to perform operations comprising:
opening, by the processor, a plurality of seats for a flight leg booking in a fare class for a flight leg of an airline flight;
allocating, by the processor, first seat protects to the flight leg booking based on a probability of selling the flight leg booking;
providing, by the processor to a mobile device of a passenger, the flight leg booking of a seat on the flight leg from the plurality of seats;
receiving, by the processor and from the mobile device of the passenger, a request for the flight leg booking of the seat on the flight leg;
generating, by the processor, an electronic ticket voucher having an authorization parameter and the flight leg booking based on the flight leg booking of the seat on the flight leg;
closing, by the processor, the plurality of seats for the flight leg booking in the fare class for the flight leg of the airline flight;

determining, by the processor and based on a set of class authorization level (AU) values, a set of expected network revenue (ENR) values,
wherein the determining the set of expected network revenue (ENR) values comprises:
determining, by the processor and for the fare class in the airline flight, a number of seat protects to fit to a bid-price curve;
determining, by the processor and for the fare class, even-spaced quantile based upon the number of seat protects to fit in the fare class; and
generating, by the processor and using a distribution table, a set of ENR values based on the even-spaced quantile for the seat;
determining, by the processor and based on the set of ENR values, a set of revised class AU values;
remapping, by the processor and based on a network value of the flight leg in a set of flight leg bookings, the set of flight leg bookings to form a set of remapped flight leg bookings, wherein the set of flight leg bookings are generated based on the set of revised class AU values;
iteratively updating, by the processor, the flight leg booking on the electronic ticket voucher based on the authorization parameter, the closing of the plurality of seats for the flight leg booking in the fare class, a number of the seat protects, the remapped set of the flight leg bookings and the set of revised class AU values;
determining, by the processor, an impact of a denied boarding on airline flights that are scheduled for departure during a time period;
iteratively updating, by the processor, the impact of the denied boarding during predetermined intervals;
adjusting, by the processor and based on the updating of the impact of the denied boarding, the authorization parameter on the electronic ticket voucher to provide a different voucher amount for the passenger on the airline flights based on latest conditions during a latest time period; and
improving, by the processor, network performance by:
analyzing a value of certain flight legs in a passenger itinerary to obtain more accurate data by avoiding under-valuation and over-valuation of the flight leg booking; and
separating enhanced demand forecasting from fare classes to reduce errors and reduce inaccurate data that slows down the network performance.

15. The system of claim 14, further comprising:
providing, to a forecasting system, the set of remapped flight leg bookings; and
providing, to an airline reservation system, the set of revised class AU values.

16. The system of claim 14, further comprising receiving, from an airline reservation system, the set of flight leg bookings.

17. The system of claim 14, wherein the number of seat protects exceeds a number of quantiles, and wherein at least two seat protects are allocated to the even-spaced quantile corresponding to a $0^{th}$ percentile.

18. The system of claim 14, further comprising determining, via a non-parametric empirical distribution estimation, a distribution of revenue for the fare class.

19. The system of claim 14, wherein responsive to the fare class being an active class, a number of quantiles is an achievable demand for the active class.

20. An article of manufacture including a non-transitory, tangible computer readable storage medium having instructions stored thereon that, in response to execution by a processor, cause the processor to perform operations comprising:
opening, by the processor, a plurality of seats for a flight leg booking in a fare class for a flight leg of an airline flight;
allocating, by the processor, first seat protects to the flight leg booking based on a probability of selling the flight leg booking;
providing, by the processor to a mobile device of a passenger, the flight leg booking of a seat on the flight leg from the plurality of seats;
receiving, by the processor and from the mobile device of the passenger, a request for the flight leg booking of the seat on the flight leg;
generating, by the processor, an electronic ticket voucher having an authorization parameter and the flight leg booking based on the flight leg booking of the seat on the flight leg;
closing, by the processor, the plurality of seats for the flight leg booking in the fare class for the flight leg of the airline flight;
determining, by the processor and based on a set of class authorization level (AU) values, a set of expected network revenue (ENR) values,
wherein the determining the set of expected network revenue (ENR) values comprises:
determining, by the processor and for the fare class in the airline flight, a number of seat protects to fit to a bid-price curve;
determining, by the processor and for the fare class, the even-spaced quantile based upon the number of seat protects to fit in the fare class; and
generating, by the processor and using a distribution table, a set of ENR values based on the even-spaced quantile for the seat;
determining, by the processor and based on the set of ENR values, a set of revised class AU values;
remapping, by the processor and based on a network value of the flight leg in a set of flight leg bookings, the set of flight leg bookings to form a set of remapped flight leg bookings, wherein the set of flight leg bookings are generated based on the set of revised class AU values;
iteratively updating, by the processor, the flight leg booking on the electronic ticket voucher based on the authorization parameter, the closing of the plurality of seats for the flight leg booking in the fare class, a number of the seat protects, the remapped set of the flight leg bookings and the set of revised class AU values;
determining, by the processor, an impact of a denied boarding on a plurality of the airline flights that are scheduled for departure during a time period;
iteratively updating, by the processor, the impact of the denied boarding during predetermined intervals;
adjusting, by the processor and based on the updating of the impact of the denied boarding, the authorization parameter on the electronic ticket voucher to provide a different voucher amount for the passenger on the airline flights based on latest conditions during a latest time period; and
improving, by the processor, network performance by:
analyzing a value of certain flight legs in a passenger itinerary to obtain more accurate data by avoiding under-valuation and over-valuation of the flight leg booking; and separating enhanced demand forecasting from fare classes to reduce errors and reduce inaccurate data that slows down the network performance.

\* \* \* \* \*